United States Patent
Ishibashi

(10) Patent No.: US 9,651,090 B2
(45) Date of Patent: May 16, 2017

(54) SINGLE SPLIT CAGE

(71) Applicant: NSK LTD., Tokyo (JP)

(72) Inventor: Yutaka Ishibashi, Takasaki (JP)

(73) Assignee: NSK LTD., Tokyo (JP)

( * ) Notice: Subject to any disclaimer, the term of this patent is extended or adjusted under 35 U.S.C. 154(b) by 144 days.

(21) Appl. No.: 14/629,660

(22) Filed: Feb. 24, 2015

(65) Prior Publication Data

US 2015/0167741 A1 Jun. 18, 2015

Related U.S. Application Data

(62) Division of application No. 13/392,761, filed as application No. PCT/JP2011/070866 on Sep. 13, 2011, now Pat. No. 9,004,775.

(30) Foreign Application Priority Data

Sep. 14, 2010 (JP) ................................. 2010-205691
Nov. 17, 2010 (JP) ................................. 2010-257211
(Continued)

(51) Int. Cl.
*F16C 33/48* (2006.01)
*F16C 33/46* (2006.01)
*F16C 19/46* (2006.01)

(52) U.S. Cl.
CPC ...... *F16C 33/4694* (2013.01); *F16C 33/4635* (2013.01); *F16C 19/463* (2013.01); *F16C 2226/70* (2013.01)

(58) Field of Classification Search
CPC ........ F16C 19/26; F16C 19/463; F16C 19/48; F16C 23/10; F16C 33/46; F16C 33/4617;
(Continued)

(56) References Cited

U.S. PATENT DOCUMENTS 4,235,487 A 11/1980 Schard
4,397,507 A 8/1983 Kraus et al.
(Continued)

FOREIGN PATENT DOCUMENTS

CN 2916242 Y 6/2007
DE 1815990 A1 7/1970
(Continued)

OTHER PUBLICATIONS

Office Action issued on Jun. 21, 2016, by the Japanese Patent Office in counterpart Japanese Application No. 2015-154835.
(Continued)

*Primary Examiner* — Adam D Rogers
(74) *Attorney, Agent, or Firm* — Sughrue Mion, PLLC

(57) ABSTRACT

A single-split cage for continuously holding a plurality of rolling elements stably for a long time. A split section for splitting at one portion in the circumferential direction is formed at regions extending between pockets adjacent to each other in the circumferential direction, engagement sections being engageable with each other are provided at the circumferential central position between the pockets and on a one-side split face and the other-side split face formed by splitting the regions, and in a state in which both the engagement sections are engaged with each other, predetermined clearances are formed between the one-side split face and the other-side split face and between the engagement sections.

6 Claims, 25 Drawing Sheets

(30) Foreign Application Priority Data

| Jun. 27, 2011 | (JP) | 2011-141439 |
| Aug. 8, 2011 | (JP) | 2011-172595 |
| Aug. 8, 2011 | (JP) | 2011-172599 |
| Aug. 24, 2011 | (JP) | 2011-182771 |
| Sep. 5, 2011 | (JP) | 2011-192973 |

(58) Field of Classification Search
CPC .............. F16C 33/4623; F16C 33/4635; F16C 33/4694; F16C 33/48
See application file for complete search history.

(56) References Cited

U.S. PATENT DOCUMENTS

| 4,472,007 | A | | 9/1984 | De Vito | |
| 4,881,830 | A | | 11/1989 | Shepard et al. | |
| 4,934,841 | A | * | 6/1990 | De Vito | F16C 33/6681 |
| | | | | | 384/572 |
| 5,178,474 | A | | 1/1993 | Muntnich et al. | |
| 6,261,005 | B1 | | 7/2001 | Winkler et al. | |
| 6,692,156 | B1 | * | 2/2004 | Ohura | F16C 33/3843 |
| | | | | | 384/523 |
| 8,967,879 | B2 | | 3/2015 | Braun | F16C 33/4635 |
| | | | | | 384/572 |
| 9,140,303 | B2 | * | 9/2015 | Dittmar | F16C 33/4635 |
| 9,145,917 | B2 | * | 9/2015 | Ishibashi | F16C 33/4635 |
| 9,382,947 | B2 | * | 7/2016 | Ishibashi | F16C 33/4694 |
| 2015/0167740 | A1 | * | 6/2015 | Ishibashi | F16C 33/4635 |
| | | | | | 384/572 |

FOREIGN PATENT DOCUMENTS

| DE | 2041342 | A1 | | 2/1972 | |
| DE | 4007452 | A1 | | 9/1991 | |
| DE | 4220585 | A1 | | 1/1994 | |
| DE | 4337948 | A1 | | 5/1995 | |
| DE | FR 2992382 | A1 | * | 12/2013 | ............. F16C 19/50 |
| FR | 2632368 | A1 | | 12/1989 | |
| GB | 1352909 | A | | 5/1974 | |
| GB | 2220234 | A | | 1/1990 | |
| JP | 57-86619 | A | | 5/1982 | |
| JP | 62258242 | A | | 11/1987 | |
| JP | 63-125221 | U | | 8/1988 | |
| JP | 1-77132 | U | | 5/1989 | |
| JP | 2007-078090 | A | | 3/2007 | |
| JP | 2008-261407 | A | | 10/2008 | |
| JP | 2009-014078 | A | | 1/2009 | |
| JP | 2010-091037 | A | | 4/2010 | |
| JP | 2011089612 | A | | 5/2011 | |
| JP | 2011247341 | A | * | 12/2011 | |
| JP | 5499327 | B2 | * | 5/2014 | .......... F16C 33/3843 |
| SE | EP 2884128 | A1 | * | 6/2015 | .......... F16C 33/6629 |

OTHER PUBLICATIONS

International Search Report (PCT/ISA/210) issued by the International Searching Authority in corresponding International Application No. PCT/JP2011/070866 on Nov. 29, 2011.

Written Opinion (PCT/ISA/237) of the International Searching Authority, issued in corresponding International Application No. PCT/JP2011/070866 on Nov. 29, 2011.

Office Action dated Oct. 29, 2013, issued by the State Intellectual Property Office of the People's Republic of China in counterpart Chinese Application No. 201180003622.4.

Communication dated Oct. 7, 2016, issued by the European Patent Office in counterpart European application No. 11817500.9.

* cited by examiner

SINGLE SPLIT CAGE

CROSS-REFERENCE TO RELATED APPLICATIONS

This application is a continuation of U.S. patent application Ser. No. 13/392,761 filed on Feb. 27, 2012, which is U.S. National Stage of International Application PCT/JP2011/070866 filed on Sep. 13, 2011, which claims priority from Japanese Patent Application No. 2010-205691 filed on Sep. 14, 2010, Japanese Patent Application No. 2010-257211 filed on Nov. 17, 2010, Japanese Patent Application No. 2011-141439 filed on Jun. 27, 2011, Japanese Patent Application No. 2011-172595 filed on Aug. 8, 2011, Japanese Patent Application No. 2011-172599 filed on Aug. 8, 2011, Japanese Patent Application No. 2011-182771 filed on Aug. 24, 2011, and Japanese Patent Application No. 2011-192973 filed on Sep. 5, 2011, the disclosures of which are incorporated herein by reference in their entirety.

TECHNICAL FIELD

The present invention relates to a cage for use in a radial roller bearing for journaling a rotation system to which a large radial load (a load in the radial direction) is applied as in a power mechanism provided for automobiles and railroad vehicles, for example, and more particularly, to a single-split cage having a circular ring shape and being split at one portion in the circumferential direction thereof. Furthermore, the present invention relates to an improvement in a single-split cage mounted in a needle (needle roller) bearing for use in automobile transmissions, etc.

BACKGROUND ART

Since a very large load is applied in the radial direction to a rotation system in a power mechanism provided for automobiles and railroad vehicles, for example, a radial roller bearing (hereafter referred to as a roller bearing or a bearing) being superior in load capacity for the load has been used conventionally and widely as a bearing for rotatably supporting the rotation shaft thereof. Such a bearing is equipped with an outer member (for example, an outer ring or a housing being maintained in a non-rotating state at all times, or a gear, a roller, etc. being rotatable during use) having a cylindrical outer track on the inner circumferential face thereof, a plurality of rollers (for example, a plurality of needles) incorporated so as to be able to roll between the outer circumferential face (inner track) of an inner member (for example, an inner ring, a shaft, etc. being rotatable during use) disposed on the inner diameter side of the outer member and the outer track, and a cage for holding these rollers at predetermined intervals (at equal intervals as an example) in the circumferential direction and mounted on the outer member and the inner member. In addition, the cage is configured so as to be equipped with a pair of circular ring sections opposed to each other coaxially with a predetermined clearance provided therebetween and a plurality of pillar sections for connecting these, for separating the area between the circular ring sections in the circumferential direction of the circular ring sections and for forming pockets in which the rollers are inserted and held rotatably.

Conventionally, for example, a needle roller bearing (needle bearing) is known as a bearing capable of being improved in load capacity by virtue of numerous rolling elements (rollers) incorporated while being made compact. Furthermore, a measure for preventing fretting during bearing rotation is taken for the needle roller bearing, and a single-split cage is applied as an example of the preventive measure in some cases (for example, refer to Patent documents 1 and 2).

For example, the single-split cage 2 shown in FIG. 25 is equipped with a pair of circular ring sections 4 and 6 having a circular ring shape and being disposed so as to be opposed to each other and a plurality of pillar sections 8 continuously extending between the circular ring sections 4 and 6 and arranged at predetermined intervals (for example, at equal intervals) in the circumferential direction. In this case, a plurality of space regions are formed at predetermined intervals (for example, at equal intervals) in the circumferential direction in the portions enclosed by the pillar sections 8 being adjacent in the circumferential direction and the pair of circular ring sections 4 and 6, and the plurality of space regions are formed as a plurality of pockets 2p for rotatably holding rolling elements (rollers), one by one. As a result, in the single-split cage 2, the plurality of rolling elements (rollers) are held at predetermined intervals (for example, at equal intervals) in the circumferential direction.

In the single-split cage 2, the rolling elements (rollers) being held in the respective pockets 2p are herein configured as slender rollers having a small diameter and a length 3 to 10 times the diameter. Furthermore, the single-split cage 2 is, for example, incorporated between inner and outer rings while rotatably holding the rolling elements (rollers) in the respective pockets 2p, one by one, and, in this state, revolves along the tracks between the inner and outer rings together with the rolling elements (rollers) during bearing rotation. The single-split cage 2 is entirely molded (for example, injection molded) with a resin (for example, thermoplastic resin).

Moreover, in the single-split cage 2, a split section for dividing the cage at one portion located in the circumferential direction in a direction being crosswise to (perpendicular to) the circumferential direction is provided. The split section 10 is formed in regions (hereafter referred to as split regions 10a and 10b) extending between the pockets 2p being adjacent to each other in the circumferential direction, and one-side split face Sa and the other-side split face Sb configured by the splitting of the two regions, the split regions 10a and 10b, are disposed so as to be opposed to each other in the circumferential direction. In this case, the pair of circular ring sections 4 and 6 extends, while having a circular ring shape, from the one-side split region 10a on which the one-side split face Sa is formed to the other-side split region 10b on which the other-side split face Sb is formed.

Besides, on the one-side split face Sa, a rectangular convex section 12 protruding (extending) toward the other-side split face Sb from a part of the central portion thereof is provided; on the other hand, on the other-side split face Sb, a concave section 14 formed by denting a part thereof into a rectangular shape so that the convex section 12 can be inserted therein and engaged therewith is provided. This prevents, for example, dislocation between the split faces Sa and Sb when the single-split cage 2 is incorporated between the inner and outer rings (more specifically, dislocation of the single-split cage 2 revolving along the tracks between the inner and outer rings during bearing rotation in the direction of the rotation axis Z of the single-split cage 2).

Furthermore, Patent document 2 discloses a single-split cage in which a convex section is provided on one-side split face of the split faces of the cage and a concave section is provided on the other-side split face and the respective end faces thereof are formed into a tapered shape so that the convex and concave sections having been engaged once are not disengaged in the circumferential direction.

A case is herein assumed as an example in which a cage for use in a bearing having an outer ring as an outer member and a rotation shaft as an inner member is mounted in the inner track portion of the rotation shaft. In this case, the cage is inserted from the end section of the rotation shaft and moved to the inner track portion of the shaft in the axial direction. At the time, in the case that step sections and flange sections having outer diameters larger than the inner diameter of the cage are provided so as to protrude in the outer circumferential range of the shaft from the end section of the shaft to the inner track, the inner circumferential section of the cage interferes with these step sections and flange sections, and the cage cannot be moved to the inner track portion in the axial direction.

Hence, for the purpose of solving this problem, a configuration of a cage in which a part of the cage made of a resin is equipped with a split section, in other words, a configuration of a cage in which each of a pair of circular ring sections (rim sections) is formed into a discontinuous nearly circular ring shape (deficit circular ring shape) having a slit (deficit section) at a part thereof (one position, as an example) is known conventionally (refer to Patent document 3 and Patent document 4). With this kind of configuration, the split section can be expanded and the cage can be increased in diameter by exerting a force to the cage in the circumferential direction so that both circumferential end faces (the faces opposed to each other at the deficit section) of the circular ring sections (rim sections) are separated.

As a result, for example, even in the above-mentioned case that the step sections and flange sections having outer diameters larger than the inner diameter of the cage are provided so as to protrude in the outer circumferential range of the shaft, when the split section of the cage is expanded (the cage is increased in diameter), the cage can be moved smoothly to the inner track portion of the rotation shaft in the axial direction without interfering with the step sections and the flange sections.

Furthermore, after the cage is moved to the inner track portion of the rotation shaft, when a force is exerted to the cage so that both end faces (the opposed faces at the deficit section) of the respective circular ring sections (rim sections) in the circumferential direction are brought close to each other in the circumferential direction, whereby the split section is shrunk (returned to its original state before expansion) and the diameter of the cage is returned to the original state. Hence, the cage is mounted on the inner track portion of the rotation shaft. At the time, a predetermined engagement mechanism is provided on the opposed faces of the pillar sections adjacent to each other in the circumferential direction with the split section provided therebetween so that the split section of the cage is not expanded again. For example, as such an engagement mechanism, a convex section is provided on one opposed face so as to protrude toward the other opposed face; furthermore, a concave section is provided on the other opposed face so that the convex section can be fitted therein; when the convex section and the concave section are fitted to each other and positioned, both the opposed faces are engaged with each other and the split section is prevented from being expanded again.

In the cage disclosed in Patent document 3, for the pair of the circular ring sections (rim sections), on the opposite side of the deficit section with respect to the center of the circular ring sections, that is, at the outer circumferential portions dislocated by 180° in phase with respect to the deficit section in the circumferential direction, a single groove (slit) is provided so as to be concave in a nearly V-shape in a cross-sectional view in the axial direction, and on the outer circumferential face of the pillar section for connecting the portions, a single groove (slit) communicating with the groove in the circular ring sections (rim sections) is also provided so as to be concave in a nearly V-shape in a cross-sectional view in the axial direction.

Since the grooves are provided in the circular ring sections (rim sections) and the pillar section, in the case that a force is exerted in the circumferential direction to the cage so that both end faces (the opposed faces in the deficit section) of the circular ring sections (rim sections) are separated from each other, while the grooves in the circular ring sections (rim sections) and the pillar section are used as fulcrums, the cage is elastically deformed so that the grooves are collapsed. Hence, the split section can be expanded easily, that is, the cage can be increased in diameter easily. Furthermore, in the cage disclosed in Patent document 4, the inner circumferential sections of a pair of circular ring sections (rim sections) are made larger in diameter than the inner circumferential sections of pillar sections along the entire circumference and made thinner than the pillar sections in the radial direction, whereby the split section thereof can be expanded easily, that is, the cage can be increased in diameter easily.

RELATED ART REFERENCE

Patent Reference

Patent document 1: JP-A-2008-261407
Patent document 2: JP-A-S63-125221
Patent document 3: German Patent Application Laid-Open Specification No. 1815990
Patent document 4: J JP-A-S57-86619

SUMMARY OF THE INVENTION

Problem to be Solved by the Invention

In the above-mentioned conventional single-split cage 2, the thickness W1 (more specifically, the thickness W1 in the circumferential direction) of the one-side split region 10a is set so as to be smaller than the thickness W2 (more specifically, the thickness W2 in the circumferential direction) of the other-side split region 10b. In other words, the one-side split region 10a is set so as to be thinner than the other-side split region 10b, that is, the other-side split region 10b is set so as to be thicker than the one-side split region 10a.

When attention is paid to the strength (rigidity) of the one-side split region 10a and the other-side split region 10b, the strength (rigidity) of the one-side split region 10a being thin is made lower than the strength (rigidity) of the other-side split region 10b being thick. In this case, in the split section 10 of the single-split cage 2, the two split regions 10a and 10b being different from each other in thickness are formed, whereby a difference in strength (rigidity) occurs between the split regions 10a and 10b.

In that case, depending on the degree of the difference in strength (rigidity), a state occurs in which it becomes difficult to uniformly maintain (securely obtain) the strength (rigidity) of the entire single-split cage 2 in the circumferential direction; in the case that a plurality of rolling elements (rollers) are held in the single-split cage 2 in this state, the one-side split region 10a is degraded early due to an external force exerted to a portion being low in strength (rigidity), for example, and it becomes difficult to continuously hold the rolling elements (rollers) stably for a long time; as a result, there is a danger that the single-split cage 2 is degraded early.

In addition, when attention is paid to the thicknesses W1 and W2 of the one-side split region 10a and the other-side split region 10b, an uneven chill (shrinkage cavity) is apt to occur in the thin split region 10a being thin and the thick split region 10b being thick at the time when the single-split cage 2 made of a resin is injection molded. In the case that such an uneven chill (shrinkage cavity) occurs in the two split regions 10a and 10b, in the split section 10, it becomes difficult to maintain the dimensional accuracy between the one-side split face Sa and the other-side split face Sb constant, whereby the split faces Sa and Sb cannot be disposed so as to be accurately opposed to each other.

Hence, depending on the degree of the uneven chill (shrinkage cavity), it becomes difficult that single-split cage 2 is maintained in a preset contour shape (attitude); in the case that a plurality of rolling elements (rollers) are held in the single-split cage 2 in the above-mentioned state, for example, it becomes difficult to continuously hold the plurality of rolling elements (rollers), incorporated between the inner and outer rings, stably for a long time; as a result, there is a danger that the single-split cage 2 is degraded early.

Furthermore, when attention is paid to the disposition configuration of the one-side split face Sa and the other-side split face Sb at which the splitting (separation) of the split regions 10a and 10b is performed in the split section 10, the split section 10 (the one-side and the other-side split faces Sa and Sb) is provided at a position relatively away from (dislocated from) the circumferential central position (more specifically, the position in which the circumferential length between the pockets 2p on both sides in the circumferential direction is divided in two) between the pockets 2p on both sides thereof in the circumferential direction.

In other words, the split section 10 (the one-side and the other-side split faces Sa and Sb) is provided at a position away from (dislocated from) the portion aligned with the interval pitch of the plurality of pockets 2p in the circumferential direction. From a different point of view, the disposition position of the split section 10 (the one-side and the other-side split faces Sa and Sb) and the circumferential central position between the pockets 2p on both sides thereof in the circumferential direction are relatively dislocated in phase in the circumferential direction.

In this case, for example, when the single-split cage 2 is mounted at a predetermined position using an automatic assembly machine, it is necessary to preset the mounting direction thereof. Hence, effort and time are required in the assembly process, and the handling performance and the assembling performance thereof are reduced, whereby the reduction of the cost for the assembly has a constant limit determined by that amount. In the case that the cage is mounted in disregard of the mounting direction, there is a danger that the single-split cage 2 is damaged by a positioning pin that is used for the assembly process.

In addition, in the split section 10, it is conceivable that, for example, the thickness W1 of the one-side split region 10a is increased (expanded) as large as the thickness W2 of the other-side split region 10b so that the thickness of the one-side split region 10a on which the one-side split face Sa is formed and the thickness of the other-side split region 10a on which the other-side split face Sa is formed become equal to each other (W1=W2). However, with this configuration, the number of the pockets 2p is compelled to be reduced by the amount. Hence, the number of the rolling elements (rollers) is reduced; as a result, the load capacity of the single-split cage 2 cannot be maintained and improved.

Furthermore, in the single-split cage 2 according to Patent document 2, at the time of the minute movement (a movement for a countermeasure for fretting) of the cage during operation, the tapered end faces of the concave and convex sections slide while generating component forces also in the axial direction, whereby there is a danger that the cage is worn or damaged.

Moreover, in the cage disclosed in Patent document 3 described above, when the split section is expanded, it is inevitable that the stress of a force exerted to the cage is concentrated in the grooves of the circular ring sections (rim sections) and the pillar section and in the vicinities thereof, whereby the cage is apt to be damaged starting from the grooves and there is a danger that the strength of the cage is lowered. On the other hand, in the cage disclosed in Patent document 4 described above, the pair of circular ring sections (rim sections) is made uniformly thinner in the radial direction than the pillar sections around the entire circumferences thereof; hence, it is assumed that when the split section is expanded, stress concentration in a specific portion can be avoided to some extent. On the other hand, since the inner circumferential sections of the pair of circular ring sections (rim sections) are made uniformly thin around the entire circumferences thereof, in the case that an inner track is dented on the outer circumferential face of an inner member and the cage is used for eng face guidance, there is a danger that the cage rides over the outer circumferential face of the inner member. In particular, in the case that the configuration around a bearing is restricted, such a dangerous state is apt to occur.

Still further, in the cage disclosed in Patent document 3 described above, in the case that the same number of rollers are held in the cage having the same diameter, the pillar sections become more slender as the diameter of the rollers becomes larger. On the other hand, as the diameter of the rollers to be held becomes larger, it is difficult to expand the split section of the cage accordingly. In other words, the groove (slit) provided in the pillar section is required to be expanded to easily expand the split section and to easily increase the cage in diameter; however, as the diameter of the rollers becomes larger, the pillar sections become more slender, whereby there is a restriction in that the pillar section having a thickness (cross-sectional area) capable of allowing the groove (slit) to be expanded is obtained securely. As a result, the number of the rollers to be held in the cage is inevitably required to be reduced, and there is a danger that the load capacity of the bearing is lowered.

The present invention is made to solve the above-mentioned problems and has an object to provide a single-split cage capable of continuously holding a plurality of rolling elements stably for a long time by eliminating the difference in the strength (rigidity) between the split regions, by maintaining the strength (rigidity) of the entire cage uniform in the circumferential direction and by maintaining the dimensional accuracy between the split regions constant at the time of molding and also capable of improving load capacity and achieving low cost for assembly. Furthermore, the present invention has an object to provide a radial roller bearing cage (a single-split cage as an example) capable of allowing its split section to be expanded easily and sufficiently and capable of effectively preventing from riding over track members (inner and outer members) while avoiding the deterioration in strength and the reduction in the number of rollers to be held.

Means for Solving the Problem

For the purpose of attaining the above-mentioned objects, the present invention is attained by the following configurations.

(1) A single-split cage is equipped with a pair of circular ring sections having a circular ring shape and being disposed so as to be opposed to each other; a plurality of pillar sections continuously extending between the circular ring sections and arranged at predetermined intervals in the circumferential direction; and a plurality of pockets formed in the portions enclosed by the pair of circular ring sections and the plurality of pillar sections and at predetermined intervals in the circumferential direction, wherein in the single-split cage, a split section for splitting the cage at one portion in the circumferential direction thereof in a direction being crosswise to the circumferential direction is provided; the split section is formed at regions extending between the pockets adjacent to each other in the circumferential direction, and at the circumferential center position between these pockets, a one-side split face and the other-side split face formed by splitting the regions are disposed so as to be opposed in the circumferential direction; engagement sections being mutually engageable are respectively provided on the one-side split face and the other-side split face, and these engagement sections are disposed so as to be opposed to each other in the circumferential direction; and in a state in which the engagement sections of both the one-side split face and the other-side split face are mutually engaged, predetermined clearances are formed between the one-side split face and the other-side split face and between the engagement sections.

(2) In the above-mentioned item (1), on the one-side split face, as the engagement sections, a plurality of one-side convex sections protruding toward the other-side split face and a one-side concave section formed by denting the area between these one-side convex sections are provided; on the other-side split face, as the engagement sections, a plurality of other-side concave sections with which the plurality of one-side convex sections are engageable and an other-side convex section protruding toward the one-side split face between the other-side concave sections and engageable with the one-side concave section are provided; in a state in which the engagement sections of both the one-side split face and the other-side split face are engaged with each other, predetermined clearances are formed respectively between the one-side convex section and the other-side convex section and between the one-side concave section and the other-side convex section; and in the clearances, the clearances between the mutual engagement sections in the circumferential direction are set so as to be smaller than the clearance between the one-side split face and the other-side split face in the circumferential direction.

(3) In the above-mentioned item (2), in a state in which both the engagement sections of both the one-side split face and the other-side split face are engaged with each other, the clearance between the one-side split face and the other-side split face in the circumferential direction and the clearance between the engagement sections in the circumferential direction are set so as to satisfy the relationship of A>B=C, wherein the clearance formed between the one-side split face and the other-side split face is A, the clearance formed between the one-side convex section and the other-side concave section is B, and the clearance formed between the one-side concave section and the other-side convex section is C.

(4) In the above-mentioned item (2) or (3), in a state in which both the engagement sections of the one-side split face and the other-side split face are engaged with each other, the mutual clearances between the engagement sections in the direction perpendicular to the circumferential direction are set so as to satisfy the relationship of D>E, wherein the clearance formed between the one-side convex section and the other-side concave section is D, and the clearance formed between the one-side concave section and the other-side convex section is E.

(5) In any one of the above-mentioned items (2) to (4), on the one-side split face, diameter-increase restricting concave sections are formed on the axial outsides of the plurality of one-side convex sections; on the other-side split face, diameter-increase restricting convex sections capable of being engaged with the diameter-increase restricting concave sections are formed on the axial outsides of the plurality of the other-side concave section; and the axial side faces of the diameter-increase restricting concave section and the diameter-increase restricting convex section, opposed to each other, are formed into a tapered shape so as to make contact with each other when the split section is expanded in the circumferential direction.

(6) In the above-mentioned item (5), the clearance between the diameter-increase restricting concave section and the diameter-increase restricting convex section, formed in a direction perpendicular to the circumferential direction, is larger than the clearance between the one-side concave section and the other-side convex section, formed in a direction perpendicular to the circumferential direction.

(7) A single-split cage is equipped with a pair of circular ring sections having a circular ring shape and being disposed so as to be opposed to each other; a plurality of pillar sections continuously extending between the circular ring sections and arranged at predetermined intervals in the circumferential direction; and a plurality of pockets formed in the portions enclosed by the pair of circular ring sections and the plurality of pillar sections and at predetermined intervals in the circumferential direction, wherein in the single-split cage, a split section for splitting the cage at one portion in the circumferential direction thereof in a direction being crosswise to the circumferential direction is provided; and in the pair of circular ring sections, the thickness of the start point sections thereof in the radial direction, dislocated from the split section by 180° in phase in the circumferential direction, is formed so as to be smaller than the thickness in the vicinity of the split section in the radial direction.

(8) In the above-mentioned item (7), the pair of circular ring sections has thin sections and thick sections being different in thickness in the radial direction, the thin sections are positioned at the start point sections, the thick sections are positioned in the vicinity of the split section; and the boundaries of the thin sections and the thick sections are positioned on the pockets.

(9) In the above-mentioned item (7), the pair of circular ring sections have thin sections and thick sections being different in thickness in the radial direction, the thin sections are positioned at the start point sections, the thick sections are positioned in the vicinity of the split section; and the boundaries of the thin sections and the thick sections are positioned on the pillar sections.

(10) A single-split cage is equipped with a pair of rim sections and a plurality of pillar sections, wherein the pair of rim sections has a discontinuous incomplete ring shape, respectively having deficit sections, each at one portion, and the deficit sections of the rim sections are disposed coaxially in the axial direction so as to be opposed to each other with a predetermined clearance provided therebetween in a state in which the deficit sections have the same phase in the circumferential direction; the plurality of pillar sections are used to connect the pair of rim sections and to separate the region between the rim sections in the circumferential direction of the rim sections, thereby forming pockets for allowing rollers serving as rolling elements to be inserted and held rotatably; the pair of rim sections has thin sections being thin in the radial direction, the diameter of the inner circumferential sections of which is made larger than that of the inner circumferential section of the pillar section, and also has thick sections being thick in the radial direction, the diameter of which is made smaller than that of the thin sections; and the thin sections are disposed at portions positioned on the opposite side of the deficit sections with respect to the center of the inner circumferential sections of the pair of rim sections.

(11) In the above-mentioned item (10), the thin sections and the thick sections, plural in number, are disposed alternately on the inner circumferential sections of each of the rim sections, and the thin sections and the thick sections are disposed while respectively having the same phase in the circumferential direction.

(12) In the above-mentioned item (11), the boundaries of the thin sections and the thick sections adjacent to each other are positioned at portions in which the pair of rim sections is connected by the pillar sections.

(13) In the above-mentioned item (10), the thin sections and the thick sections are formed continuously without steps such that the inner diameter is decreased gradually from the thinnest portions of the thin sections to the thickest portions of the thick sections.

(14) In any one of the above-mentioned items (10) to (13), the single-split cage is equipped with an engagement mechanism in which the diameter of the pair of rim sections can be increased by expanding the deficit sections and the diameter of the pair of rim sections can be maintained constant by preventing the expansion of the deficit sections.

(15) A single-split cage is equipped with a pair of rim sections and a plurality of pillar sections, wherein the pair of rim sections has a discontinuous incomplete ring shape, respectively having deficit sections, each at one portion, and the deficit sections of the rim sections are disposed coaxially in the axial direction so as to be opposed to each other with a predetermined clearance provided therebetween in a state in which the deficit sections have the same phase in the circumferential direction; the plurality of pillar sections are used to connect the pair of rim sections and to separate the region between the rim sections in the circumferential direction of the rim sections, thereby forming pockets for allowing rollers serving as rolling elements to be inserted and held rotatably; the pair of rim sections has thin sections being thin in the radial direction, the diameter of the outer circumferential sections of which is made smaller than that of the outer circumferential section of the pillar section, and also has thick sections being thick in the radial direction, the diameter of which is made larger than that of the thin sections; and the thin sections are disposed at portions positioned on the opposite side of the deficit sections with respect to the center of the outer circumferential sections of the pair of rim sections.

(16) In the above-mentioned item (15), the inner circumferential sections of the pair of rim sections are made larger in diameter than the inner circumferential sections of the pillar sections, whereby the thin sections are made thinner than the thick sections on both the outer diameter sides and the inner diameter sides in the radial direction.

(17) In the above-mentioned item (16), the portions made thinner than the thick sections on the outer diameter sides in the radial direction and the portions made thinner than the thick sections on the inner circumferential sides in the radial direction are disposed in the same phase in the circumferential direction.

(18) In the above-mentioned item (16), the portions made thinner than the thick sections on the outer diameter sides in the radial direction and the portions made thinner than the thick sections on the inner circumferential sides in the radial direction are disposed in different phases in the circumferential direction.

(19) In any one of the above-mentioned items (15) to (18), the boundaries of the thin sections and the thick sections are positioned at portions in which the pair of rim sections is connected by the pillar sections.

(20) A single-split cage is equipped with a pair of rim sections and a plurality of pillar sections, wherein the pair of rim sections has a discontinuous incomplete ring shape, respectively having deficit sections, each at one portion, and the deficit sections of the rim sections are disposed coaxially in the axial direction so as to be opposed to each other with a predetermined clearance provided therebetween in a state in which the deficit sections have the same phase in the circumferential direction; the plurality of pillar sections are used to connect the pair of rim sections and to separate the region between the rim sections in the circumferential direction of the rim sections, thereby forming pockets for allowing rollers serving as rolling elements to be inserted and held rotatably; and the pair of rim sections are disposed so as to be opposed to each other in a state in which the centers of the inner circumferential sections thereof are made eccentric with respect to the rotation axis of the cage to the opposite sides.

(21) In the above-mentioned item (20), the pair of rim sections has thin sections being thin in the radial direction, the diameter of the inner circumferential sections of which is made larger than that of the inner circumferential sections of the pillar sections, and also has thick sections being thick in the radial direction, the diameter of which is made smaller than that of the thin sections; the thin sections are disposed at portions positioned on the opposite side of the deficit sections with respect to the center of the inner circumferential sections of the pair of rim sections; and the thin sections and the thick sections are formed continuously without steps such that the inner diameter is decreased gradually from the thinnest portions of the thin sections to the thickest portions of the thick sections.

(22) In any one of the above-mentioned items (15) to (21), the single-split cage is equipped with an engagement mechanism in which the diameter of the pair of rim sections can be increased by expanding the deficit sections and the diameter of the pair of rim sections can be maintained constant by preventing the expansion of the deficit sections.

Advantage of the Invention

The present invention can realize a single-split cage capable of continuously holding a plurality of rolling elements stably for a long time by eliminating the difference in the strength (rigidity) between the split regions, by maintaining the strength (rigidity) of the entire cage uniform in the circumferential direction and by maintaining the dimensional accuracy between the split regions constant at the time of molding and also capable of improving load capacity and achieving low cost for assembly.

Furthermore, the present invention can realize a radial roller bearing cage (a single-split cage as an example) capable of allowing its split section to be expanded easily and sufficiently and capable of effectively preventing from riding over track members (inner and outer members) while avoiding the deterioration in strength and the reduction in the number of rollers to be held.

BRIEF DESCRIPTION OF THE DRAWINGS

FIG. 3A is a sectional view taken on line Y-Y of FIG. 1B, and FIG. 3B is a sectional view showing another configuration example of the configuration shown in FIG. 3A;

MODES FOR CARRYING OUT THE INVENTION

A single-split cage according to a first embodiment of the present invention will be described below referring to the accompanying drawings.

Figure 25:
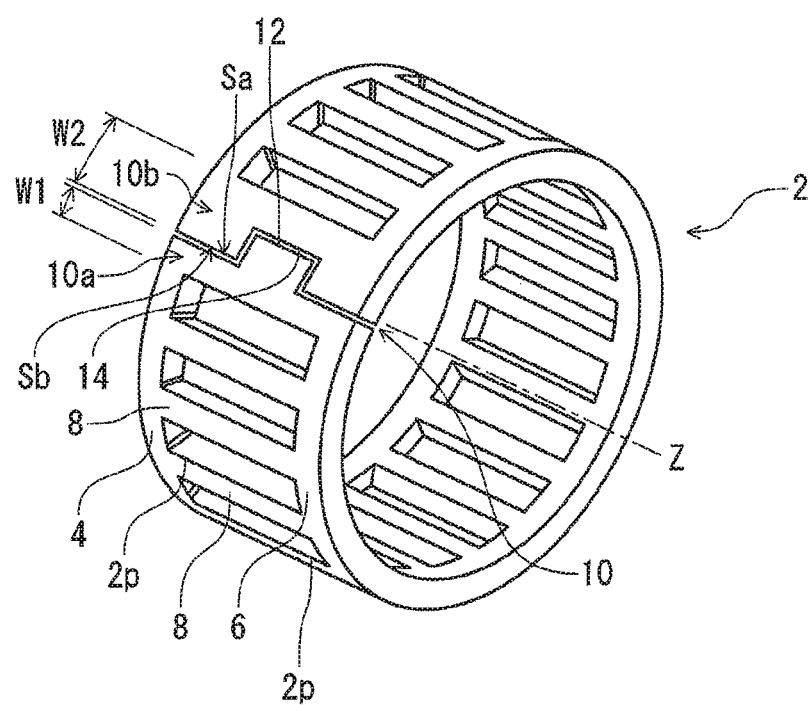
FIG. 25 is a schematic perspective view showing an entire configuration of the conventional single-split cage.

Since this embodiment is an improvement of the single-split cage 2 shown in FIG. 25, only the improved portions thereof will be described below. In this case, with respect to the same components as those of the above-mentioned single-split cage, the same codes as the reference codes assigned to the components are assigned in the drawings, and their descriptions are omitted.

Figure 1A:
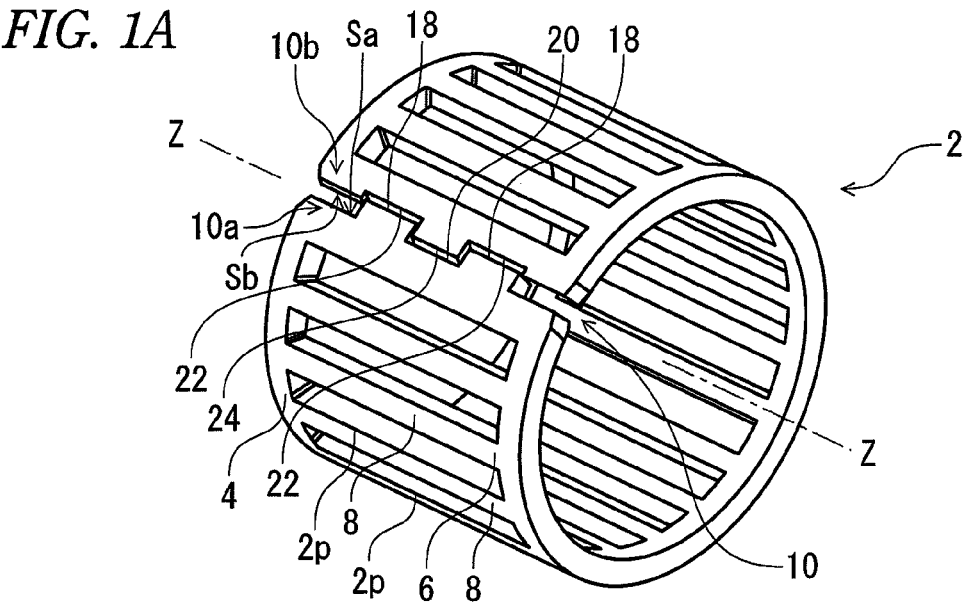
FIG. 1A is a schematic perspective view showing an entire configuration of a single-split cage according to a first embodiment of the present invention.
Figure 1B:
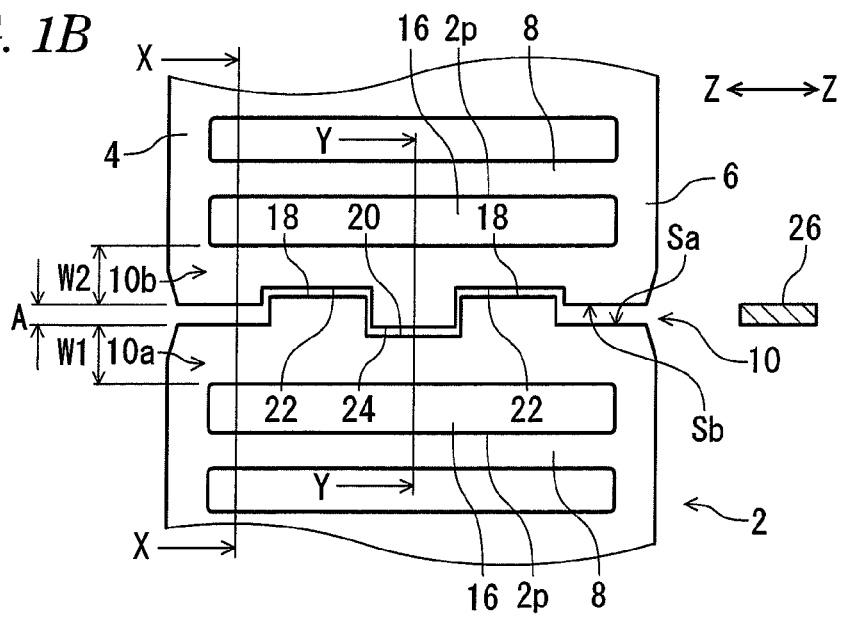
FIG. 1B is a magnified plan view showing a peripheral configuration around the split section shown in FIG. 1A.
Figure 1C:
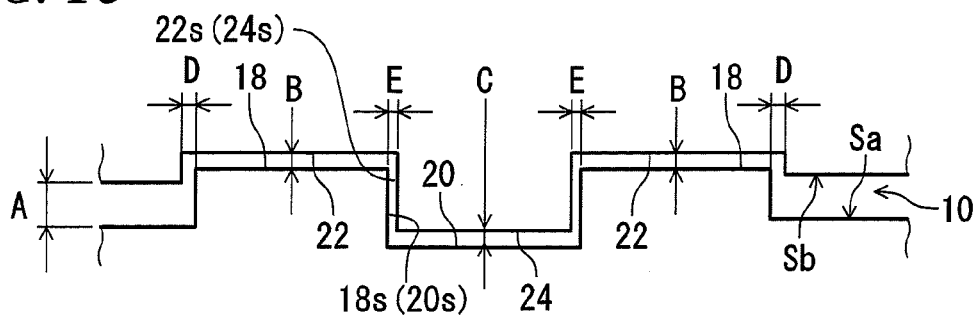
FIG. 1C is a magnified plan view showing positional relationships among the clearances in the split section shown in FIG. 1A.
Figure 2:
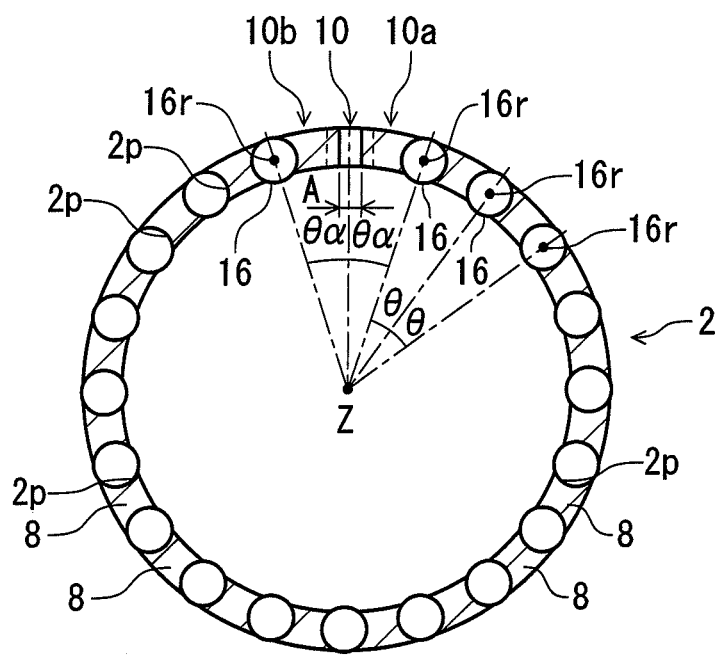
FIG. 2 is a sectional view showing the single-split cage shown in FIG. 1A, taken on line X-X of FIG. 1B.

As shown in FIGS. 1A to 2, in the single-split cage 2 according to this embodiment, a split section 10 for splitting the cage at one portion in the circumferential direction thereof is provided along a direction being crosswise to (perpendicular to) the circumferential direction. The split section 10 is formed at regions (that is, split regions 10a and 10b) extending between pockets 2p adjacent to each other in the circumferential direction, and at the circumferential central position between these pockets 2p, a one-side split face Sa and the other-side split face Sb formed by splitting to two split regions, the split regions 10a and 10b, are disposed so as to be opposed to each other in the circumferential direction.

The circumferential central position between the pockets 2*p* in which the split section 10 (the one-side and the other-side split faces Sa and Sb) is disposed will be described herein.

It is preferable that the circumferential central position should be set at a position in which the circumferential length between the pockets 2*p* on both sides of the split section 10 (the one-side and the other-side split faces Sa and Sb) in the circumferential direction is split into two halves. In other words, it is preferable that the circumferential central position of the split section 10 should be set so that while rolling elements (rollers) 16 are held in the respective pockets 2*p* being adjacent to each other in the circumferential direction at the split section 10 (FIG. 1B and FIG. 2), the line segments extending from the rotation axis Z of the cage 2 to the rotation centers 16*r* of the rolling elements (rollers) 16 have angles $\theta\alpha$ being equal to each other in the circumferential direction.

Furthermore, in the single-split cage 2 in which the rolling elements (rollers) 16 are held in the respective pockets 2*p* (FIG. 1B and FIG. 2), the line segments extending from the rotation axis Z of the cage 2 to the rotation centers 16*r* of the rolling elements (rollers) 16 have angles $\theta$ being equal to each other in the circumferential direction. In this case, it may be possible that $\theta\alpha=\theta$ or $\theta\alpha\neq\theta$.

In both cases, in the regions (the split regions 10*a* and 10*b*) extending between the pockets 2*p* (the rolling elements (rollers) 16) on both sides of the split section 10 in the circumferential direction, the thickness W1 (more specifically, the thickness W1 in the circumferential direction) of the one-side split region 10*a* on which the one-side split face Sa is formed and the thickness W2 (more specifically, the thickness W2 in the circumferential direction) of the other-side split region 10*b* on which the one-side split face Sb is formed are set so as to have the same thickness (W1=W2) (FIG. 1B).

Moreover, in the single-split cage 2 in which the thicknesses of the split regions 10*a* and 10*b* are set so as to be equal to each other (W1=W2), engagement sections being mutually engageable are respectively provided on the split section 10 (the one-side split face Sa and the other-side split face Sb), and these engagement sections are disposed so as to be opposed to each other in the circumferential direction. In addition, in a state in which the engagement sections of both the one-side split face Sa and the other-side split face Sb are engaged with each other, predetermined clearances are formed between the one-side split face Sa and the other-side split face Sb and between the engagement sections.

More specifically, on the one-side split face Sa, as the engagement sections, a plurality (for example, two in the figure) of one-side convex sections 18 protruding toward the other-side split face Sb and a one-side concave section 20 formed by denting the area between these one-side convex sections 18 are provided. On the other hand, on the other-side split face Sb, as the engagement sections, a plurality (for example, two in the figure) of other-side concave sections 22 into which the plurality of one-side convex sections 18 are partly inserted so as to be engageable and an other-side convex section 24 protruding toward the one-side split face Sa between the other-side concave sections 22 and partly inserted into the one-side concave section 20 so as to be engageable are provided.

In other words, in this embodiment, the axial inner face 18*s* of the one-side convex section 18 constitutes the axial side face 20*s* of the one-side concave section 20, and the axial inner face 22*s* of the other-side concave section 22 constitutes the axial side face 24*s* of the other-side convex section 24; these are formed so as to be in parallel with each other in the circumferential direction.

Although the shapes of the convex sections 18 and 24 and the concave sections 20 and 22 are shown as being rectangular in the drawings, they are not limited to this shape. The point is that, provided that the shapes are formed, for example, so that the mutual dislocation (more specifically, the dislocation in a direction along the rotation axis Z of the single-split cage 2 revolving along the space between the inner and outer rings during bearing rotation) between the split faces Sa and Sb when the single-split cage 2 is mounted between the inner and outer rings can be prevented, the shapes can be set as desired, such as triangular or circular. Furthermore, the sizes and the numbers of the convex sections 18 and 24 and the concave sections 20 and 22 are set, for example, depending on the sizes of the split regions 10*a* and 10*b* and the intended use and the use environment of the single-split cage 2, thereby not limited particularly herein.

In a state in which the engagement sections of both the one-side split face Sa and the other-side split face Sb are engaged with each other, predetermined clearances are formed respectively between the one-side convex section 18 and the other-side convex section 22 and between the one-side concave section 20 and the other-side convex section 24. In this case, in the clearances, the clearances between the engagement sections in the circumferential direction are set so as to be smaller than the clearance between the one-side split face Sa, other than the engagement sections, and the other-side split face Sb, other than the engagement sections in the circumferential direction.

More specifically, in the state in which both the engagement sections are engaged with each other, it is preferable that the clearance between the one-side split face Sa, other than the engagement sections, and the other-side split face Sb, other than the engagement sections, in the circumferential direction and the clearances between the engagement sections in the circumferential direction are set so as to satisfy the relationship of:

$$A > B = C$$

wherein the clearance formed between the one-side split face Sa, other than the engagement sections, and the other-side split face Sb, other than the engagement sections in the circumferential direction is A, the clearance formed between the one-side convex section 18 of the engagement sections of the one-side split face and the other-side concave section 22 of the engagement sections of the other-side split face in the circumferential direction is B, and the clearance formed between the one-side concave section 20 of the engagement sections of the one-side split face and the other-side convex section 24 of the engagement sections of the other-side split face in the circumferential direction is C (FIG. 1C).

Nonetheless, the clearance B and the clearance C are not necessarily set so as to be equal (B=C); for example, the clearance B can be made larger than the clearance C (B>C), or conversely, the clearance B can be made smaller than the clearance C (B<C) depending on the sizes of the split regions 10*a* and 10*b* and the intended use and the use environment of the single-split cage 2. However, in both cases, it is preferable that the clearances B and C are set so as to be smaller than the clearance A.

Furthermore, it is preferable that the mutual clearances between the engagement sections should be considered not only in the above-mentioned circumferential direction but also in a direction perpendicular to the circumferential direction.

In other words, in the state in which both the engagement sections of the one-side split face Sa and the other-side split face Sb are engaged with each other, it is preferable that the mutual clearances between the engagement sections in the direction perpendicular to the circumferential direction are set so as to satisfy the relationship of:

$$D>E$$

wherein the clearance formed between the one-side convex section 18 and the other-side concave section 22 is D, and the clearance formed between the one-side concave section 20 and the other-side convex section 24 is E (FIG. 1C).

When the positional relationship between the clearance D and the clearance E is described, the clearance D can be defined, for example, as a clearance formed between the one-side convex section 18 and the other-side concave section 22 on the outside (that is, close to circular ring sections 4 and 6) of each of the two one-side convex sections 18. On the other hand, the clearance E can be defined, for example, as a clearance formed between the one-side concave section 20 and the other-side convex section 24 on the outside (that is, close to the circular ring sections 4 and 6) of the one-side concave section 20.

With this embodiment, since the split section 10 is set at the circumferential central position between the pockets 2p as described above, the thickness W1 of the one-side split region 10a on which the one-side split face Sa is formed and the thickness W2 of the other-side split region 10b on which the other-side split face Sb is formed can be set so as to be equal to each other (W1=W2).

In this case, when attention is paid to the strength (rigidity) of the one-side split region 10a and the other-side split region 10b, since the thicknesses of the split regions 10a and 10b are made equal (W1=W2), the strength (rigidity) of the one-side split region 10a having the thickness W1 and the strength (rigidity) of the other-side split region 10b having the thickness W2 can be made equal (uniform). In other words, the difference in strength (rigidity) between these split regions 10a and 10b can be eliminated.

Hence, the strength (rigidity) of the entire single-split cage 2 can be maintained (securely obtained) uniformly in the circumferential direction. For this reason, for example, in a state in which a plurality of rolling elements (rollers) are held in the single-split cage 2, even in the case that an external force is exerted during bearing rotation, the external force can be exerted uniformly as a load on the entire cage 2, whereby the durability (anti-fretting performance) of the single-split cage 2 can be maintained and improved; as a result, the rolling elements (rollers) can be continuously held stably for a long time.

Furthermore, when attention is paid to the thicknesses W1 and W2 of the one-side split region 10a and the other-side split region 10b, an uneven chill (shrinkage cavity) does not occur in both the split regions 10a and 10b at the time when the single-split cage 2 made of a resin is injection molded. In this case, in the split section 10 having been molded, the dimensional accuracy between the one-side split face Sa and the other-side split face Sb can be maintained constant; as a result, the split faces Sa and Sb can be disposed so as to be accurately opposed to each other.

With this configuration, the single-split cage 2 can be maintained in a preset contour shape (attitude). Hence, for example, a plurality of rolling elements (rollers) can be held stably in the single-split cage 2, whereby the bearing can be rotated stably for a long time.

Furthermore, when attention is paid to the disposition configuration of the one-side split face Sa and the other-side split face Sb at which the splitting (separation) of the split regions 10a and 10b is performed in the split section 10, the split section 10 (the one-side and the other-side split faces Sa and Sb) can be provided at the circumferential central position (more specifically, the position in which the circumferential length between the pockets 2p on both sides in the circumferential direction is divided in two) between the pockets 2p on both sides thereof in the circumferential direction.

In this case, for example, when the single-split cage 2 is mounted at a predetermined position by an automatic assembly machine, a process of presetting its mounting direction becomes unnecessary. Hence, the assembly process can be made efficient, whereby the handling and assembly performance thereof can be improved significantly. As a result, the cost for the assembly can be reduced drastically.

Furthermore, with this embodiment, the mutual dislocation between the split faces Sa and Sb at the time when the single-split cage 2 is mounted between the inner and outer rings can be prevented sufficiently only by the engagement sections of the split section 10. In this case, the clearance A formed between the one-side split face Sa and the other-side split face Sb can be set as desired. Hence, for example, the clearance A can be set to a size capable of allowing a positioning pin 26 (FIG. 1B) that is used for the assembly process to be inserted; as a result, a problem in which the single-split cage 2 itself is damaged by the positioning pin 26 can be prevented from occurring.

Moreover, with this embodiment, the split section 10 (the one and the other split faces Sa and Sb) can be provided at the circumferential central position (the position in which the circumferential length between the pockets 2p on both sides in the circumferential direction is divided in two) between the pockets 2p on both sides thereof in the circumferential direction. In this case, the split regions 10a and 10b between the pockets 2p are not required to be increased, whereby the above-mentioned engagement sections can be formed without reducing the number of the pockets 2p. Hence, the number of the rolling elements (rollers) to be incorporated can be maintained unchanged or can be improved; as a result, the load capacity of the single-split cage 2 can be maintained and improved.

However, the present invention is not limited to the above-mentioned embodiment, and technological ideas relating to the following modified examples are also included in the technological scope of the present invention.

As a first modified example, at the engagement sections of the split section 10, steps may be formed in the radial direction (a direction perpendicular to the rotation axis Z of the single-split cage 2 revolving along the space between the inner and outer rings during bearing rotation). As one example, a configuration is shown in which steps are provided in the radial direction on the one-side concave section 20 and the other-side convex section 24 in the engagement sections.

Herein, as the steps in the radial direction, on the one-side concave section 20, a protruding section 20a protruding from a part thereof (the inside diameter side in the figure as an example) toward the other-side convex section 24 is formed, and on the other-side convex section 24, a hollow section 24a into which a part of the protruding section 20a is inserted so as to be engageable is formed by denting a part (the inside diameter side in the figure as an example) of the other-side convex section 24.

The shapes and sizes of the protruding section 20a and the hollow section 24a are set, for example, depending on the shapes and sizes of the one-side concave section 20 and the other-side convex section 24 and thus not be limited particularly.

Figure 3A:
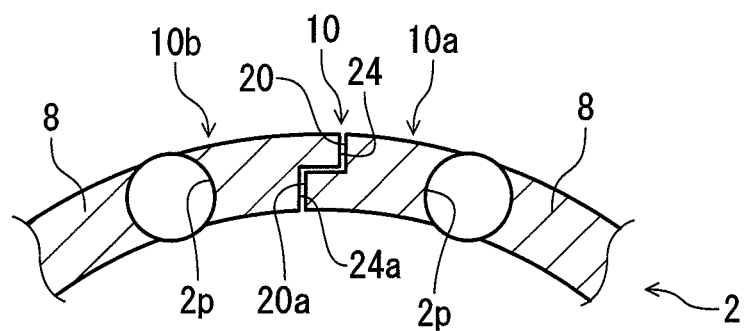
FIGS. 3A and 3B are partially enlarged views showing a configuration of a single-split cage according to a first modified example of the first embodiment of the present invention.
Figure 3B:
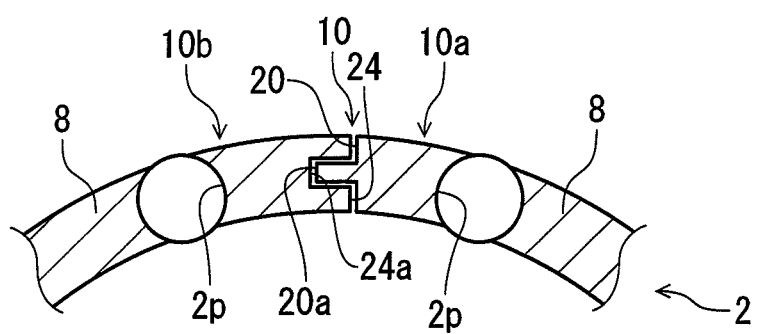

For example, as shown in FIG. 3B, it may be possible that the protruding section 20a is formed at the center of the one-side concave section 20 in the radial direction and that the hollow section 24a is formed at the center of the other-side convex section 24 in the radial direction.

In the first modified example, the steps (FIGS. 3A and 3B) in the radial direction are formed at the engagement sections of the split section 10 as described above; hence, the protruding section 20a is engaged with the hollow section 24a in the radial direction while the engagement sections of both the one-side split face Sa and the other-side split face Sb are engaged with each other; consequently, the single-split cage 2 can be prevented from expanding in the radial direction and from increasing in diameter (expanding) via the split section 10.

Figure 4:
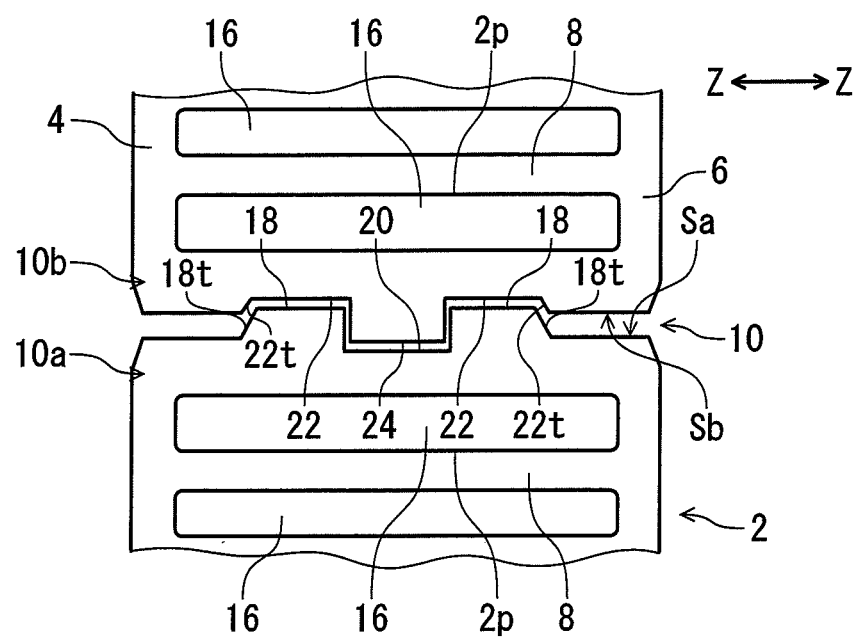
FIG. 4 is a partially enlarged plan view showing an external configuration of a single-split cage according to a second modified example of the first embodiment of the present invention.

As a second modified example, as shown in FIG. 4, the end faces 18t of the one-side convex sections 18 on the outsides (that is, close to the circular ring sections 4 and 6) of the respective one-side convex sections 18 may be tapered. With this configuration, the strength (rigidity) of the root portions (more specifically, the portions continuously extending from the end faces 18t to the one-side split face Sa) of the respective one-side convex sections 18 can be raised. As a result, the durability of the engagement sections of the split section 10 can be improved. Furthermore, in correspondence with the formation of the taper on the end faces 18t of the one-side convex sections 18, it is preferable that tapered end faces 22t should also be formed so as to be opposed to the above-mentioned end faces 18t on the other-side concave sections 22 into which parts of the one-side convex sections 18 are inserted so as to be engaged.

Figure 5:
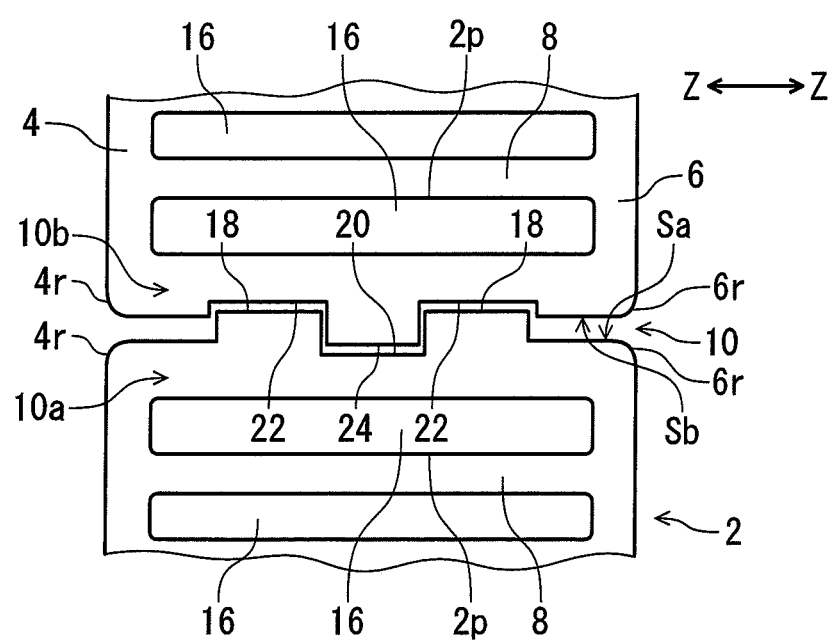
FIG. 5 is a partially enlarged plan view showing an external configuration of a single-split cage according to a third modified example of the first embodiment of the present invention.

As a third modified example, as shown in FIG. 5, in the split section 10, chamfers 4r and 6r are respectively provided on the edge sections (corner sections) extending from the one-side split face Sa and the other-side split face Sb to the circular ring sections 4 and 6. With this configuration, the positioning pin 26 (FIG. 1B) to be used for the above-mentioned assembly process can be easily inserted into the clearance A, and the efficiency of the assembly process can be improved further. The shape of the chamfers 4r and 6r is circular in the figure as an example; however, the shape is not limited to this, but may be elliptical, for example.

Figure 6A:
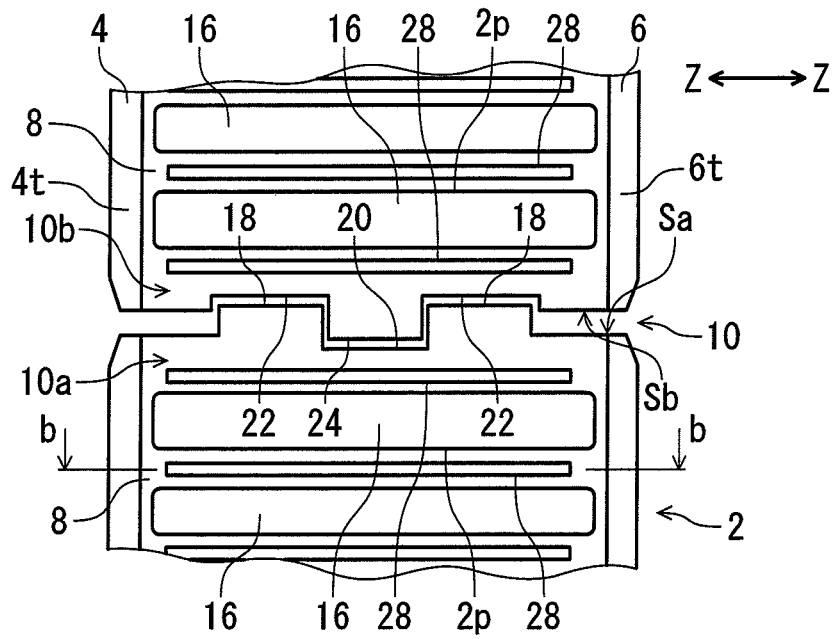
FIG. 6A is a partially enlarged view showing an external configuration of a single-split cage according to a fourth modified example of the first embodiment of the present invention.
Figure 6B:
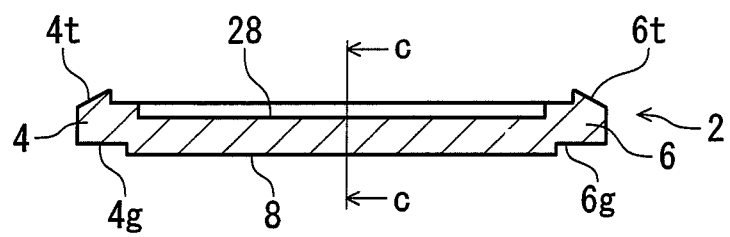
FIG. 6B is a sectional view taken on line b-b of FIG. 6A.
Figure 6C:
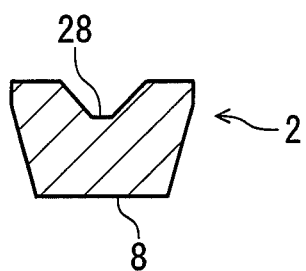
FIG. 6C is a sectional view taken on line c-c of FIG. 6B.

As a fourth modified example, as shown in FIGS. 6A to 6C, lubricity improving means may be provided for the single-split cage 2. In this case, as an example of the lubricity improving means, on the outer circumferential sides of a plurality of pillar sections 8, lubricant storage grooves 28 extending along the pillar sections 8 are formed. In addition, tapered faces 4t and 6t continuously extending in the circumferential direction are formed respectively on the outer circumferential sides of the circular ring sections 4 and 6, and step sections 4g and 6g being dented from the other portions are formed respectively on the inner circumferential sides of the circular ring sections 4 and 6.

The lubricant storage groove 28 may be formed for all of the plurality of pillar sections 8 or may be formed for only the arbitrarily selected pillar sections 8; however, it is preferable that the lubricant storage grooves 28 should be formed at equal intervals in the circumferential direction so that the lubricant (for example, grease or oil) accommodated in the lubricant storage grooves 28 is distributed uniformly to the entire single-split cage 2.

The groove width, groove depth and groove length of the lubricant storage groove 28 are set, for example, depending on the size, shape, etc. of the pillar section 8, thereby not limited particularly herein. Furthermore, the cross-sectional shape of the lubricant storage groove 28 is trapezoidal close to triangular as an example in the figure; however, the shape is not limited to this, and various shapes, such as circular or rectangular shapes, may be applied. The point is that the shape should only be a shape capable of accommodating lubricant (for example, grease or oil).

Furthermore, the inclination angle of the tapered faces 4t and 6t and the hollow amount and hollow shape of the step sections 4g and 6g are set, for example, depending on the use environment and the intended use of the single-split cage 2 or the size, shape, etc of the circular ring sections 4 and 6, thereby not limited particularly herein. The point is that the inclination angle of the tapered faces 4t and 6t and the hollow amount and hollow shape of the step sections 4g and 6g should only be set so that lubricant (for example, grease or oil) can be efficiently circulated as the single-split cage 2 revolves during bearing rotation.

In the fourth modified example, the lubricity improving means (the lubricant storage grooves 28, the tapered faces 4t and 6t and the step sections 4g and 6g) are provided for the single-split cage 2 as described above; hence, lubricant (for example, grease or oil) can be distributed uniformly to the entire single-split cage 2 in addition to the effect of the above-mentioned first embodiment, and lubricant (for example, grease or oil) can be circulated efficiently as the single-split cage 2 revolves during bearing rotation.

Figure 7A:
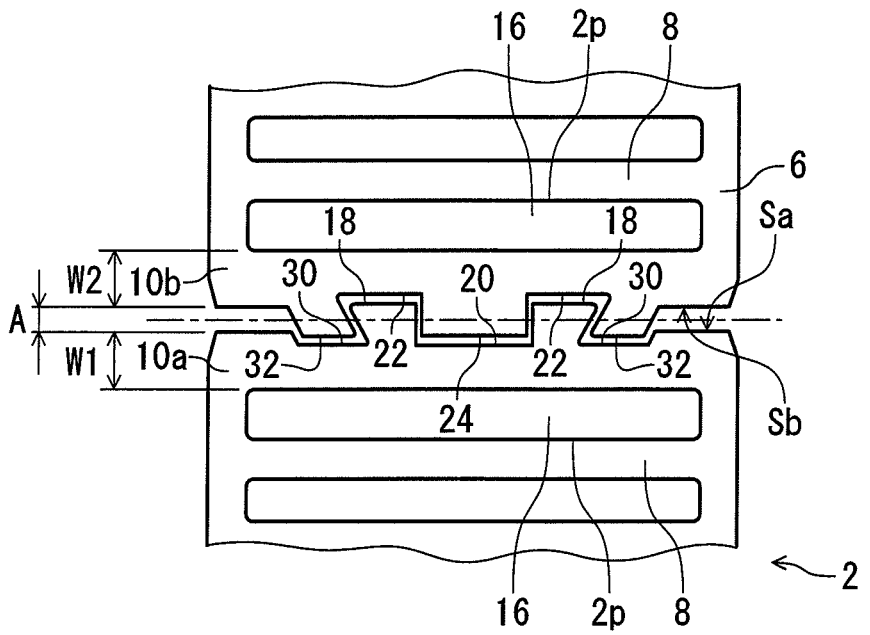
FIG. 7A is a partially enlarged view showing an external configuration of a single-split cage according to a fifth modified example of the first embodiment of the present invention.
Figure 7B:
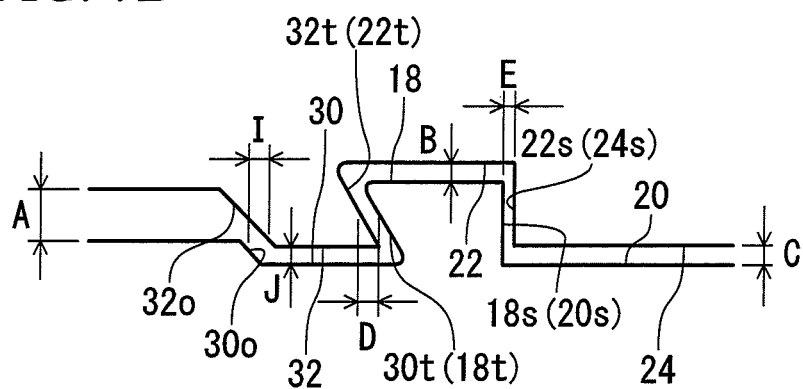
FIG. 7B is an enlarged plan view showing positional relationships among the clearances in the split section shown in FIG. 7A.

In the fifth modified example shown in FIGS. 7A and 7B, on the one-side split region 10a, a plurality of diameter-increase restricting concave sections 30 are formed on both the axial outsides of the plurality of one-side convex sections 18 provided as the engagement sections, and on the other-side split region 10b, diameter-increase restricting convex sections 32 capable of being engaged with the diameter-increase restricting concave sections 30 are formed on both the axial outsides of the plurality of the other-side concave section 22 provided as the engagement sections.

The axial inner face 30t of the diameter-increase restricting concave section 30 constitutes the axial outside face 18t of the one-side convex section 18, and the axial inner face 32t of the diameter-increase restricting convex section 32 constitutes the axial outer face 22t of the other-side concave section 22.

In addition, the axial inner face 30t of the diameter-increase restricting concave section 30 and the axial inner face 32t of the diameter-increase restricting convex sections 32 are respectively formed into tapered shapes being in parallel with each other, and make contact with each other, thereby being capable of suppressing the split section 10 from being opened excessively when a force is exerted in the circumferential direction so that the split section 10 is expanded. In other words, the tip end face of the diameter-increase restricting convex section 32 and the tip end face of the one-side convex section 18 constituting the axial inner face 30t of the diameter-increase restricting concave section 30 are overlapped with each other as viewed from the circumferential direction.

The clearance between the axial inner face 30t of the diameter-increase restricting concave section 30 and the axial inner face 32t of the diameter-increase restricting convex sections 32 is defined as the clearance D formed between the one-side convex section 18 and the other-side concave section 22 and is set so as to satisfy the relationship of D>E as in the above-mentioned embodiment. Furthermore, the clearance I between the axial outer face 30*o* of the diameter-increase restricting concave section 30 and the axial outer face 32*o* of the diameter-increase restricting convex sections 32 is also set so as to satisfy the relationship of I>E.

Moreover, when it is assumed that the clearance formed between the diameter-increase restricting concave section 30 and the diameter-increase restricting convex sections 32 in the circumferential direction is J, it is preferable that the clearance should only be set so as to satisfy the relationship of A>J and should preferably be set so as to satisfy the relationship of A>B=C=J.

Hence, in the fifth modified example, the split section 10 can be prevented from being opened excessively when the cage 2 is mounted in a transmission, etc., and the one-side concave section 20 and the other-side convex section 24 can be used for guidance during operation, whereby abrasion and damage of the cage 2 can be suppressed.

Figure 8:
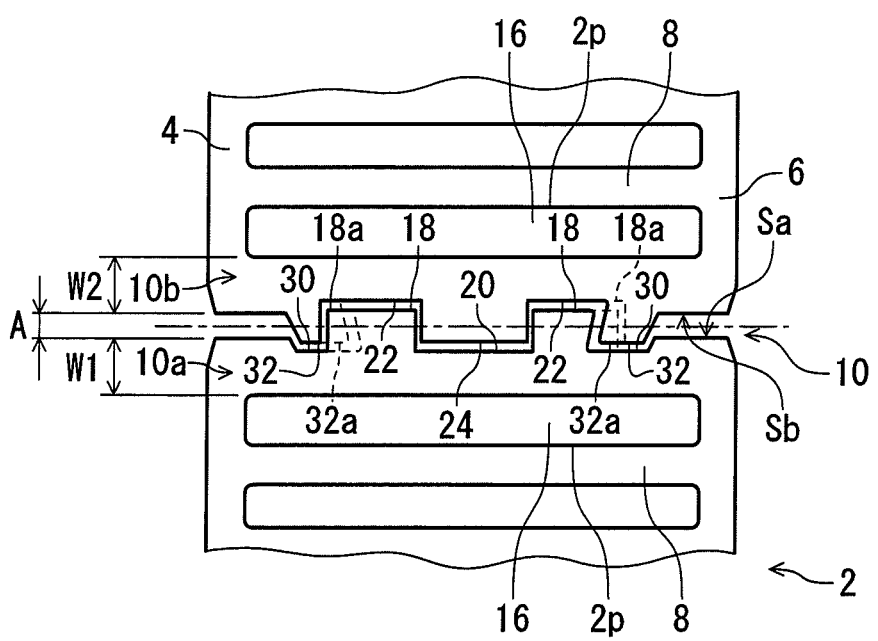
FIG. 8 is a partially enlarged plan view showing an external configuration of a single-split cage according to a sixth modified example of the first embodiment of the present invention.

In a sixth modified example shown in FIG. 8, unlike the single-split cage 2 according to the fifth modified example, the single-split cage 2 is configured so that the one-side split region 10*a* and the other-side split region 10*b* are restricted from being dislocated in the radial direction; among the plurality of diameter-increase restricting convex sections 32, the inner diameter side of the one diameter-increase restricting convex section 32 is partially cut off to form a step in the radial direction, and the outer diameter side of the other diameter-increase restricting convex section 32 is partially cut off to form a step in the radial direction. Furthermore, the protruding section 18*a* formed by extending the inner diameter side of the adjacent one-side convex section 18 into the diameter-increase restricting concave section 30 so as to protrude toward the hollow section 32*a* is engaged with the hollow section 32*a* formed in the diameter-increase restricting convex sections 32, the inner diameter side of which is cut off; and the protruding section 18*a* formed by extending the outer diameter side of the adjacent one-side convex section 18 into the diameter-increase restricting concave section 30 so as to protrude toward the hollow section 32*a* is engaged with the hollow section 32*a* formed in the diameter-increase restricting convex sections 32, the outer diameter side of which is cut off.

Figure 9:
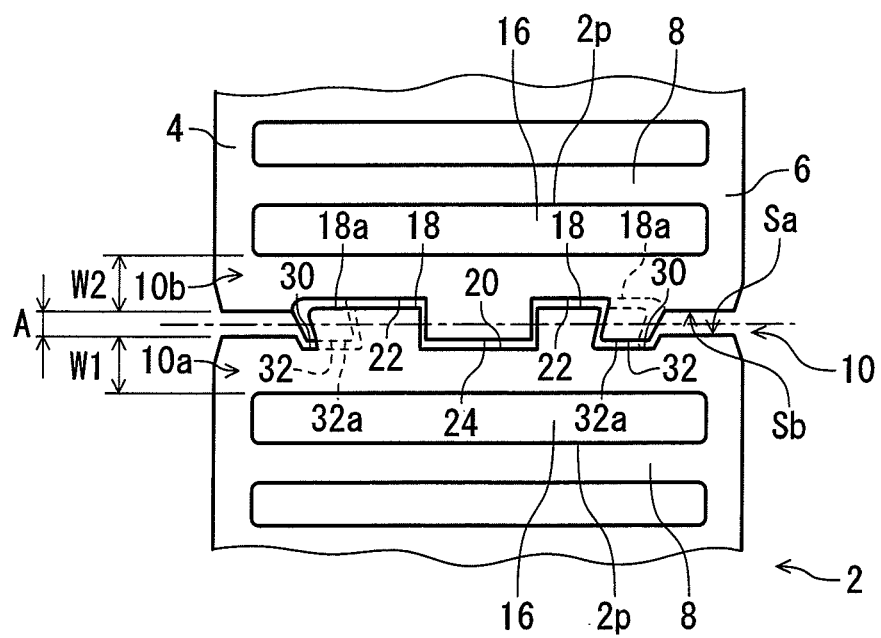
FIG. 9 is a partially enlarged plan view showing an external configuration of a single-split cage according to a seventh modified example of the first embodiment of the present invention.

In the sixth modified example, the step in the radial direction is formed by partially cutting off the inner diameter side or the outer diameter side of the diameter-increase restricting convex sections 32; however, as in a seventh modified example shown in FIG. 9, a step in the radial direction may be formed by cutting off the entire inner diameter side or the entire outer diameter side of the diameter-increase restricting convex sections 32 in the axial direction. In this case, the protruding section 18*a* formed on the one-side convex section 18 can be formed so as to be larger than that in the sixth modified example, whereby the opposed faces of the hollow section 32*a* and the protruding section 18*a* for restricting the one-side split region 10*a* and the other-side split region 10*b* are dislocated in the radial direction can be made wider securely.

Figure 10:
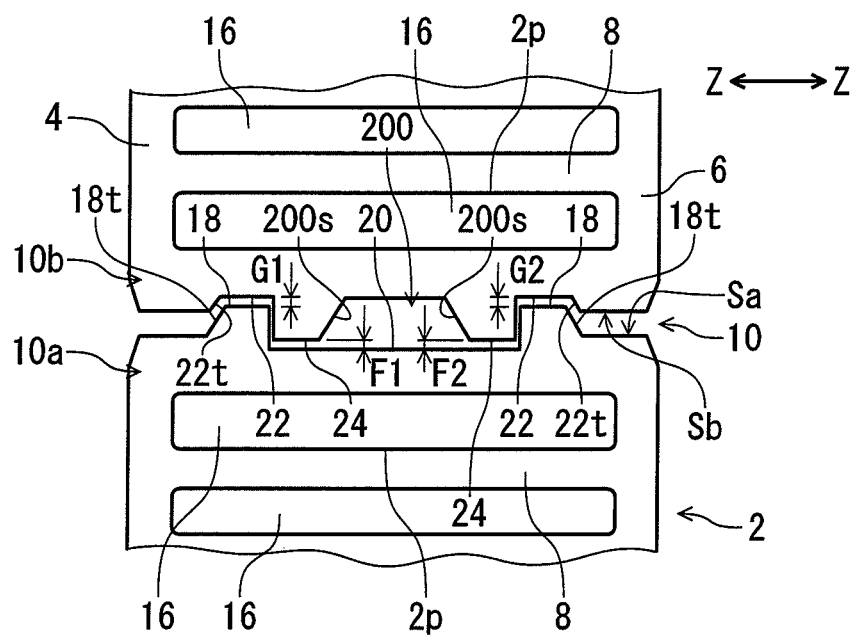
FIG. 10 is a partially enlarged plan view showing an external configuration of a single-split cage according to an eighth modified example of the first embodiment of the present invention.

In an eighth modified example shown in FIG. 10, as a partial improvement of the single-split cage 2 according to the above-mentioned first embodiment (more specifically, the second modified example shown in FIG. 4), a hollow section 200 may be formed by partially denting the axial central portion of the other-side convex section 24 (in other words, by partially cutting off the central portion).

The size of the hollow section 200 is set depending on the size of the other-side convex sections 24; hence, the size is not limited partially herein. In addition, the shape of the hollow section 200 can be formed into a desired shape, such as trapezoidal, rectangular, triangular or circular. In FIG. 10, as an example, the hollow section 200 having a trapezoidal shape in a plan view is shown; with this configuration, tapered faces 200*s* having a shape being narrowed toward the hollowing direction are formed on both sides of the trapezoidal hollow section 200, whereby the strength (rigidity) of the respective other-side convex sections 24 remaining on both sides of the hollow section 200 can be improved. However, the tapered faces 200*s* are not necessarily required to be formed.

With this kind of configuration, it is preferable that the circumferential clearances F1 and F2 between the other-side convex sections 24 remaining on both sides of the hollow section 200 and the one-side concave section 20 and the clearances G1 and G2 between the one-side convex sections 18 and the other-side concave sections 22 should be set so as to satisfy the relationships of F1=F2 and G1=G2. At this time, the magnitude relationship between F1 (=F2) and G1 (=G2) may be set so as to satisfy the relationship of F1 (=F2)>G1 (=G2) or may be set so as to satisfy the relationship of F1 (=F2)<G1 (=G2).

In this modified example, the hollow section 200 is formed in the other-side convex section 24 as described above; hence, the difference in volume (difference in thickness) from the other pillar sections 8 can be reduced by that amount thereof, whereby the influence of "shrinkage" or the like during cage molding can be suppressed and the moldability (molding accuracy) can be improved. The other effects are similar to those of the above-mentioned first embodiment and their descriptions are omitted.

Figure 11:
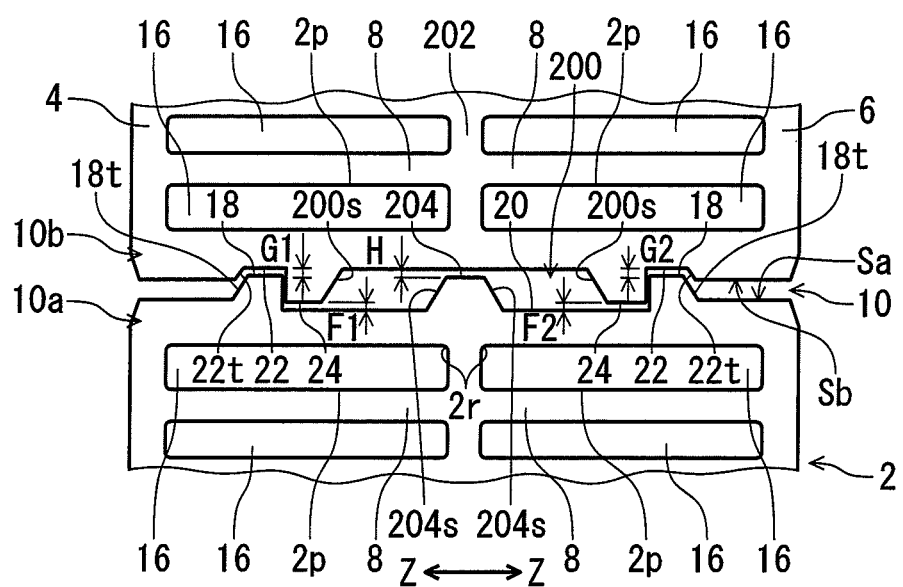
FIG. 11 is a partially enlarged plan view showing an external configuration of a single-split cage according to a ninth modified example of the first embodiment of the present invention.

In addition, in the embodiment and the respective modified examples described above, the single-split cage 2 of a single-row type has been assumed to be used and described; however, the technological idea of the present invention can also be applied to a single-split cage of a double-row type. As a ninth modified example, FIG. 11 shows a single-split cage 2 of a double-row type in which the configuration of the single-split cage 2 shown in FIG. 10 is disposed on both sides in the axial direction while being centered at the central pillar portion 202 extending in the circumferential direction from the one-side split region 10*a* to the other-side split region 10*b*.

In this case, it is preferable that a protruding section 204 formed by partially protruding the axial central portion of the one-side concave section 20 should be formed toward the axial central portion of the hollow section 200. In this configuration, the size of the protruding section 204 is set depending on the width of the hollow section 200, thereby not limited particularly herein. Furthermore, the shape of the protruding section 204 can be formed into a desired shape, such as trapezoidal, rectangular, triangular or circular. In FIG. 11 as an example, the protruding section 204 having a trapezoidal shape in a plan view is shown; with this configuration, tapered faces 204*s* having a shape being narrowed toward the direction of the protrusion are formed on both sides of the trapezoidal protruding section 204, whereby the strength (rigidity) of the single-split cage 2 of the double-row type can be improved. However, the tapered faces 204*s* are not necessarily required to be formed.

Moreover, it is preferable that the configuration position of the protruding section 204 should be set so as to be aligned in the circumferential direction along the central pillar portion 202. Hence, the strength (rigidity) of the single-split cage 2 of the double-row type can be improved further, and the balance of the single-split cage 2 can be maintained and improved.

With this kind of configuration, it is preferable that the circumferential clearance H between the protruding section 204 and the hollow section 200 should be set so as to be aligned with (that is, coincident with) the circumferential clearances between the other-side convex sections 24 remaining on both sides of the hollow section 200 and the one-side concave section 20 or the circumferential clearances G1 and G2 between the one-side convex sections 18 and the other-side concave sections 22, whichever smaller. It is preferable that the circumferential clearances F1 and F2 and the circumferential clearances G1 and G2 should be set so as to satisfy the relationships of F1=F2 and G1=G2. At this time, the magnitude relationship between F1 (=F2) and G1 (=G2) may be set so as to satisfy the relationship of F1 (=F2)>G1 (=G2) or may be set so as to satisfy the relationship of F1 (=F2)<G1 (=G2).

With this modified example, the protruding section 204 is formed as described above; hence, the thicknesses in the vicinities of the corner sections 2r on the side of the central pillar portion 202 and close to the protruding section 204 in the pair of pockets 2p adjacent to the protruding section 204 can be securely obtained sufficiently, whereby the strength (rigidity) of the single-split cage 2 of the double-row type can be maintained constant. The other effects are similar to those of the single-split cage 2 shown in FIG. 10 and their descriptions are omitted.

In FIG. 11, the axial central portion of the one-side concave section 20 is partially protruded to form the protruding section 204; however, instead of this, the hollow section 200 may be partially protruded to form a protruding section protruded in the opposite direction, or protruding sections may be protruded from both the one-side concave section 20 and the hollow section 200.

Figure 12:
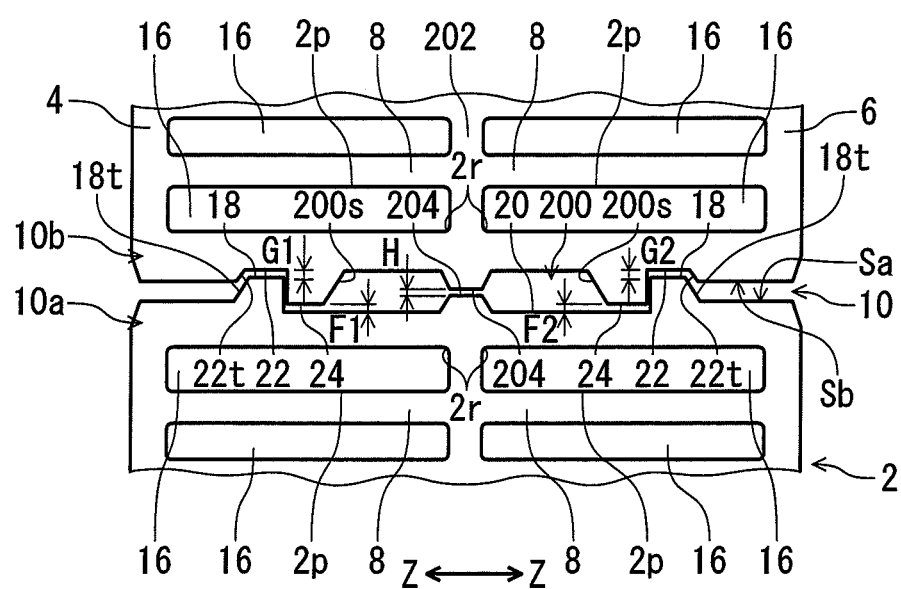
FIG. 12 is a partially enlarged plan view showing an external configuration of a single-split cage according to a tenth modified example of the first embodiment of the present invention.

As a tenth modified example, FIG. 12 shows a single-split cage 2 of a double-row type configured so that the protruding sections 204 are protruded from both the one-side concave section 20 and the hollow section 200. In this case, the circumferential clearance H between the protruding sections 204 should only be set so as to be aligned with (that is, coincident with) the circumferential clearances F1 and F2 or the circumferential clearances G1 and G2, whichever smaller.

With this kind of configuration, the protruding sections 204 are formed so as to protrude from both the one-side concave section 20 and the hollow section 200; hence, the thicknesses in the vicinities of the corner sections 2r on the side of the central pillar portion 202 and close to the respective protruding sections 204 in the respective pockets 2p adjacent to the respective protruding sections 204 can be securely obtained sufficiently, whereby the strength (rigidity) of the single-split cage 2 of the double-row type can be maintained constant. The other effects are similar to those of the single-split cage 2 shown in FIG. 10 and their descriptions are omitted.

In the embodiment and the respective modified examples described above, it is assumed that the single-split cage 2 is entirely molded (for example, injection molded) using a resin (for example, thermoplastic resin); however, even if the single-split cage 2 is formed using an elastic material other than a resin, configurations similar to those of the embodiment and the respective modified examples described above can be applied and similar effects can be accomplished.

Next, radial roller bearing cages according to other embodiments of the present invention will be described referring to the accompanying drawings. An object of each of the other embodiments described later is to provide a radial roller bearing cage (a single-split resin cage as an example) capable of allowing its split section to be expanded easily and sufficiently and capable of effectively preventing from riding over inner members while avoiding the deterioration in strength and the reduction in the number of rollers to be held, and technological ideas for accomplishing this object are described.

It is possible to assume that bearings or the like for journaling rotating systems in power mechanisms (an automobile transmission as an example) provided for automobiles, railroad vehicles, etc. are used as bearings in which the radial roller bearing cage according to the present invention is incorporated; however, the bearings are not limited to these bearings.

Such a bearing is equipped with an outer member (for example, an outer ring or a housing being maintained in a non-rotating state at all times, or a gear, a roller, etc. being rotatable during use) having a cylindrical outer track on the inner circumferential face thereof; and a plurality of radial rollers (a plurality of needles as an example) incorporated so as to be able to roll between the outer circumferential face (inner track) of the inner member (for example, an inner ring, a shaft, etc. being rotatable during use) disposed on the inner diameter side of the outer member and the outer track. The size of the bearing, the presence or absence of the inner ring, the size (diameter and length) and the number of the rollers, etc. can be set as desired depending on the use conditions, the intended use of the bearing, etc., thereby not limited particularly herein.

In addition, when these rollers roll between the tracks (the outer track and the inner track), the rollers are held by the bearing cage so as to be rotatable inside the pockets thereof to prevent the increase in rotational resistance, seizure, etc. caused by the friction due to mutual contact between the rollers. Bearing lubrication (oil lubrication or grease lubrication) may be performed to further effectively prevent the increase in rotational resistance, seizure, etc.

Figure 13:
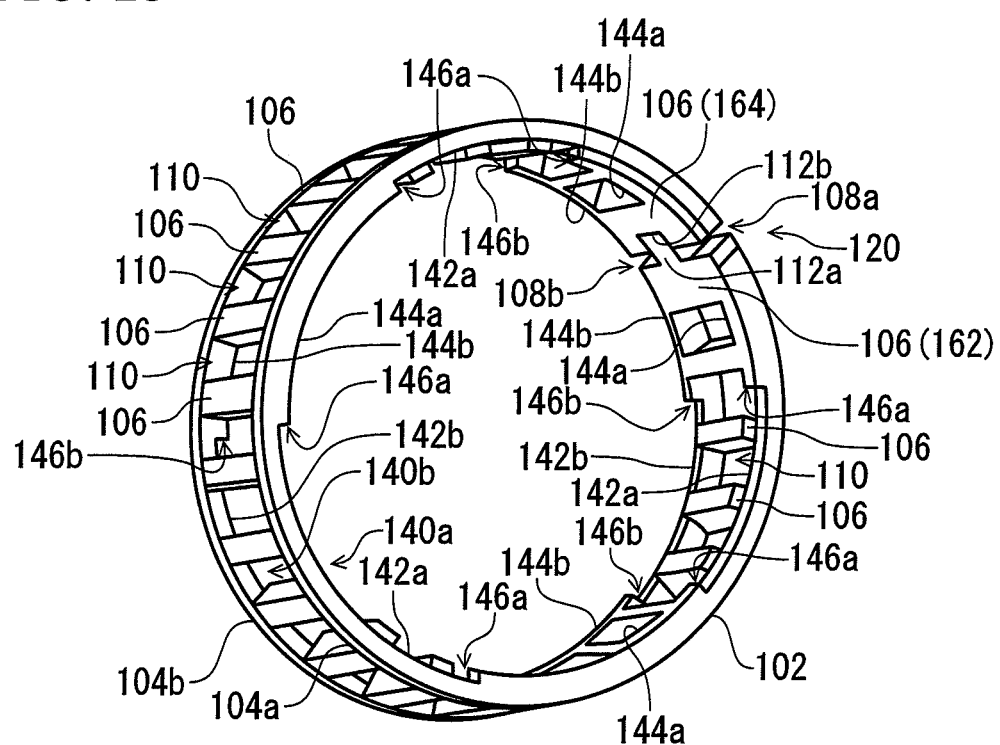
FIG. 13 is a perspective view showing an entire configuration of a radial roller bearing cage (single-split cage) according to a second embodiment of the present invention.

FIG. 13 shows the configuration of a radial roller bearing cage (hereafter referred to as a single-split cage) 102 according to a second embodiment of the present invention. In this embodiment, it is assumed that the single-split cage 102 is made of a predetermined elastic material (a resin as an example) and that the whole of the cage (rim sections 104a and 104b and pillar sections 106 described later) is integrally molded by injecting the elastic material into a metal mold (injection molding); however, this does not eliminate the possibility of performing molding using other known methods. Furthermore, it may be possible that a molded body obtained after injection molding is subjected to cutting, grinding, etc. separately to form the single-split cage 102 as a completed product.

The single-split cage 102 is configured so as to be equipped with a pair of circular ring sections 104a and 104b (hereafter referred to as rim sections) and a plurality of pillar sections 106, and is split at one portion in the circumferential direction thereof along a direction being crosswise to (perpendicular to) the circumferential direction. In the split region, the pair of rim sections 104a and 104b has a discontinuous incomplete ring shape (nearly C-shaped), respectively having deficit sections 108a and 108b, each at one portion, and the deficit sections 108a and 108b of the respective rim sections 104a and 104b are disposed coaxially in the axial direction so as to be opposed to each other with a predetermined clearance provided therebetween in a state in which the deficit sections 108*a* and 108*b* have the same phase in the circumferential direction (in a state in which the positions of the deficit sections 108*a* and 108*b* in the circumferential direction are coincident with each other). In other words, the single-split cage 102 has, as an appearance profile, a nearly cylindrical shape (the so-called single-split cage structure) having a single split section 120 (hereafter referred to as a crack section) in the circumferential direction. The diameter of the rim section 104*a* and the rim section 104*b* and the distance between the opposed sections in the axial direction should only be set as desired depending on the size of the bearing, etc.

The plurality of pillar sections 106 are used to connect the pair of rim sections 104*a* and 104*b* in the axial direction and to separate the region between the rim sections 104*a* and 104*b* in the circumferential direction, thereby forming pockets 110 for allowing rollers (needles) serving as rolling elements, not shown, to be inserted and held rotatably. In other words, a single pocket 110 is formed in the space enclosed by the two pillar sections 106 being adjacent to each other in the circumferential direction and the pair of rim sections 104*a* and 104*b*. Hence, the single-split cage 102 has a structure in which the pillar sections 106 and the pockets 110 are disposed alternately in the circumferential direction. However, in the region between the rim sections 104*a* and 104*b* separated by the two pillar sections 106 (hereafter referred to as deficit-section-adjacent pillar sections 162 and 164) disposed close to both the circumferential sides of the deficit sections 108*a* and 108*b* of the rim sections 104*a* and 104*b*, the crack section (split section) 120 is present, and no pocket 110 is formed. Hence, the single-split cage 102 has a structure in which a roller is lacking only in this region (that is, the crack section 120); in other words, the cage has a structure in which in the regions other than this region, the rollers are inserted into the pockets, one by one, and the rollers are disposed at equal intervals (at equal pitches) in the circumferential direction.

The size of the pocket 110 formed by the pillar sections 106 should only be set depending on the diameter and length of the roller so that the roller can be held so as to be rotatable in the pocket 110, and the number of the pockets 110 (the number of the pillar sections 106 from a different point of view) should only be set as desired depending on the capacity (the number of the rollers to be held) of the cage 102. In addition, the shape (the surface shape of the circumferentially opposed faces of the adjacent pillars 106 from a different point of view) of the pocket face (the face making contact with the circumferential face of the roller) should only be formed into a concave curved shape (for example, a concave curved shape having a curvature slightly smaller than that of the circumferential face of the roller). In the peripheral section of the pocket 110, it is possible to provide protruding sections (for example, claw-shaped protrusions for grasping the roller) for narrowing the opening of the pocket so that the roller inserted into the pocket 110 is held so as not to drop off.

With the above-mentioned structure (the so-called single-split cage structure) in which the deficit sections 108*a* and 108*b* are formed in the pair of rim sections 104*a* and 104*b*, one each, and the cage 102 has one crack section 120 in the circumferential direction, when a force is exerted in a direction in which the crack section 120 of the single-split cage 102 is expanded or, from a different point of view, in a direction in which both the end faces (the opposed faces of the deficit sections 108*a* and 108*b*) of the respective rim sections 104*a* and 104*b* are separated from each other, the single-split cage 102 is entirely deformed elastically. As a result, the crack section 120 (the deficit sections 108*a* and 108*b*) can be expanded; in other words, the diameter of the single-split cage 102 (in short, the rim sections 104*a* and 104*b*) can be increased. Furthermore, when a force is exerted in a direction in which the crack section 120 is shrunk from this state or, from a different point of view, in a direction in which both the end faces (the opposed faces of the deficit sections 108*a* and 108*b*) of the respective rim sections 104*a* and 104*b* are brought close to each other, the single-split cage 102 is entirely deformed elastically to its original state before the expansion. As a result, the crack section 120 (the deficit sections 108*a* and 108*b*) can be shrunk to its original state; in other words, the diameter of the single-split cage 102 (in short, the rim sections 104*a* and 104*b*) can be decreased to its original diameter (the diameter before the expansion). It is possible to assume a cage configuration in which the diameter of the single-split cage 102 is decreased and returned to the original diameter (the diameter before the expansion) by using only the elastic restoring force of the single-split cage 102 generated by relieving the force exerted in the direction in which the crack section 120 is expanded, without exerting a force in the direction in which the crack section 120 of the single-split cage 102 is made shrunk, or by exerting a force in the direction of shrinkage in addition to the elastic restoring force.

Hence, the diameter of the single-split cage 102 can be increased and decreased as desired, whereby a bearing can be mounted on a rotation shaft having step sections, flange sections, etc. of various sizes. After the bearing is mounted on the rotation shaft, the crack section 120 (the deficit sections 108*a* and 108*b*) of the single-split cage 102 is required to be prevented from being expanded again so that the single-split cage 102 does not drop off and is not dislocated. In other words, the diameter of the pair of rim sections 104*a* and 104*b* can be maintained constant and the diameter of the single-split cage 102 can be maintained steady by preventing the expansion (in short, re-expansion) of the deficit sections 108*a* and 108*b*.

FIG. 13 shows a configuration example of the single-split cage 102 equipped with an engagement section formed of a convex section 112*a* and a concave section 112*b* fitted to each other as an engagement mechanism. In this case, the one-side split region (the deficit-section-adjacent pillar section 162 as an example) of the deficit-section-adjacent pillar sections 162 and 164 being adjacent to each other with the crack section 120 located therebetween and disposed so as to be opposed to each other is provided with the convex section 112*a*, and the other-side split region (the deficit-section-adjacent pillar section 164 as an example) is provided with the concave section 112*b*. The convex section 112*a* protrudes, while having a predetermined shape and a predetermined size (length), from the face of the deficit-section-adjacent pillar section 162 opposed to the deficit-section-adjacent pillar section 164 in the circumferential direction, and the concave section 112*b* is cut off, while having a predetermined shape and a predetermined size (depth in the circumferential direction), from the inner diameter side to the outer diameter side at the portion of the deficit-section-adjacent pillar section 164 opposed to the deficit-section-adjacent pillar section 162 so that the concave section 112*b* can be fitted on the convex section 112*a*. The shapes and sizes (length and depth) of the convex section 112*a* and the concave section 112*b* are not limited particularly, and should only be set as desired depending on the material, the size (diameter and width) of the single-split cage 102, provided that they can be fitted into each other. Furthermore, the engagement mechanism is not limited to the mechanism formed of the convex section 112*a* and the concave section 112*b* capable of being fitted into each other, but can be modified as necessary to known various kinds of mechanisms, provided that the crack section 120 (the deficit sections 108*a* and 108*b*) of the single-split cage 102 can be suppressed from being expanded again.

In this embodiment, the pair of rim sections 104*a* and 104*b* has thin sections 142*a* and 142*b* being thin in the radial direction, the diameter of the inner circumferential sections of which is made larger than that of the inner circumferential sections of the pillar sections 106, and also has thick sections 144*a* and 144*b* being thick in the radial direction, the diameter of which is made smaller than that of the thin sections 142*a* and 142*b*. Furthermore, the thin sections 142*a* and 142*b* are disposed at portions positioned on the opposite side of the deficit sections 108*a* and 108*b* with respect to the center of the inner circumferential sections of the pair of rim sections 104*a* and 104*b*, in other words, at portions dislocated from the deficit sections 108*a* and 108*b* by 180° in phase in the circumferential direction (the portions designated by 140*a* and 140*b* in FIG. 13, hereafter referred to as start points 140*a* and 140*b*). Since the thin sections 142*a* and 142*b* and the thick sections 144*a* and 144*b* are disposed in the inner circumferential sections of the pair of rim sections 104*a* and 104*b* as described above, when a force is exerted in a direction in which the crack section 120 of the cage 102 is expanded (in a direction in which both the circumferential end faces (the opposed faces of the deficit sections 108*a* and 108*b*) of the rim sections 104*a* and 104*b* are separated from each other), the thin sections 142*a* and 142*b* can be elastically deformed significantly earlier than the thick sections 144*a* and 144*b*, whereby the entire single-split cage 102 can be elastically deformed easily. Hence, the crack section 120 (the deficit sections 108*a* and 108*b*) can be expanded easily, that is, the single-split cage 102 can be increased easily in diameter.

The sizes, shapes, numbers and disposition intervals of the thin sections 142*a* and 142*b* and the thick sections 144*a* and 144*b* are not limited particularly and can be set as desired, provided that at least the thin sections 142*a* and 142*b* are disposed at the start points 140*a* and 140*b* of the pair of rim sections 104*a* and 104*b*.

For example, FIG. 13 shows a configuration of the cage 102 in which the thin sections 142*a* and 142*b* and the thick sections 144*a* and 144*b* are disposed, three respectively. In this case, the thin sections 142*a* and 142*b* are disposed one by one at nearly equal intervals in the circumferential direction on both sides, starting from the thin sections 142*a* and 142*b* (hereafter referred to as start-point thin sections 142*a* and 142*b* for the sake of convenience) positioned at the start points 140*a* and 140*b*, and the thick sections 144*a* and 144*b* are disposed one by one between the thin sections 142*a* and 142*b* being adjacent in the circumferential direction. In other words, the thin sections 142*a* and 142*b* and the thick sections 144*a* and 144*b* are disposed, three respectively, so as to be arranged alternately in the circumferential direction in the inner circumferential sections of the rim sections 104*a* and 104*b*, whereby steps 146*a* and 146*b* are formed at the boundaries of the thin sections 142*a* and 142*b* and the thick sections 144*a* and 144*b* adjacent in the circumferential direction. Moreover, the thin sections 142*a* and 142*b* (the start-point thin sections 142*a* and 142*b*) are disposed at the start points 140*a* and 140*b* and in the vicinities thereof, and the thick sections 144*a* and 144*b* (hereafter referred to as deficit-section-adjacent thick sections 144*a* and 144*b* for the sake of convenience) are disposed in the vicinities of the deficit sections 108*a* and 108*b*.

Still further, the three thin sections 142*a* (the start-point thin section 142*a*) of the rim section 104*a* and the three thin sections 142*b* (the start-point thin section 142*b*) of the rim section 104*b* are disposed while respectively having the same phase in the circumferential direction; and the three thick sections 144*a* (the deficit-section-adjacent thick section 144*a*) of the rim section 104*a* and the three thick sections 144*b* (the deficit-section-adjacent thick section 144*b*) of the rim section 104*b* are also disposed while respectively having the same phases in the circumferential direction. In other words, the thin sections 142*a* (the start-point thin section 142*a*) and the thick sections 144*a* (the deficit-section-adjacent thick section 144*a*) are disposed so as to be symmetric with the thin sections 142*b* (the start-point thin section 142*b*) and the thick sections 144*b* (the deficit-section-adjacent thick sections 144*b*) in the circumferential direction at both the rim sections 104*a* and 104*b*.

The thin sections 142*a* and 142*b* (the start-point thin sections 142*a* and 142*b*) and the thick sections 144*a* and 144*b* (the deficit-section-adjacent thick sections 144*a* and 144*b*) are disposed in the inner circumferential regions of the rim sections 104*a* and 104*b* continuously striding over the plurality of pillar sections 106 and pockets 110 (in other words, rollers), and the boundaries of the thin sections 142*a* and 142*b* and the thick sections 144*a* and 144*b* adjacent to each other, that is, the steps 146*a* and 146*b*, are positioned not on the pillar sections 106 but on the pockets 110 of the rim sections 104*a* and 104*b*. At the time, the thin sections 142*a* and 142*b* (the start-point thin sections 142*a* and 142*b*) respectively stride over the plurality of pillar sections 106 and pockets 110 (in other words, rollers) continuously while having a constant diameter (the same diameter); and the thick sections 144*a* and 144*b* (the deficit-section-adjacent thick sections 144*a* and 144*b*) also respectively stride over the plurality of pillar sections 106 and pockets 110 (in other words, rollers) continuously while having a constant diameter (the same diameter). More specifically, the thin sections 142*a* and 142*b* (the start-point thin sections 142*a* and 142*b*) and the thick sections 144*a* and 144*b* (the deficit-section-adjacent thick sections 144*a* and 144*b*) are respectively formed continuously along the predetermined regions while respectively having constant thicknesses in the circumferential direction, and the thin sections 142*a* and 142*b* (the start-point thin sections 142*a* and 142*b*) are formed continuously along the predetermined regions while respectively having a thickness smaller than that of the thick sections 144*a* and 144*b* (the deficit-section-adjacent thick sections 144*a* and 144*b*) in the radial direction.

The start-point thin sections 142*a* and 142*b* are positioned so that the intermediate portions thereof in the circumferential direction are nearly aligned with the start points 140*a* and 140*b*. Furthermore, although the deficit-section-adjacent thick sections 144*a* and 144*b* are divided into two parts at the deficit sections 108*a* and 108*b*, in the case that these two parts are assumed to be one, the thick sections are assumed to be continuous along the predetermined regions.

In this embodiment, the thin sections 142*a* and 142*b* (the start-point thin sections 142*a* and 142*b*) are disposed continuously while striding over the plurality of pillar sections 106 and pockets 110 (in other words, rollers) as described above, whereby when the split section 120 is expanded, the stress of the force exerted to the single-split cage 102 can be exerted while being distributed to the entire thin sections 142*a* and 142*b* (in particular, the entire start-point thin sections 142*a* and 142*b*) and can thus be relieved. Hence, the stress can be effectively avoided from being exerted concentratedly to specific portions being limited extremely in the rim sections 104a and 104b and the pillar sections 106.

Furthermore, the thin sections 142a and 142b and the thick sections 144a and 144b are disposed alternately in the inner circumferential sections of the rim sections 104a and 104b, and the steps 146a and 146b are formed at the boundaries of the thin sections 142a and 142b and the thick sections 144a and 144b being adjacent to each other, whereby the thicknesses of the inner circumferential sections of the rim sections 104a and 104b in the radial direction can be prevented from being uniform along the entire circumferences and can thus be changed. Hence, for example, even in the case that an inner track is formed into a concave shape on the outer circumferential face of an inner member (an inner ring, a shaft, etc. being rotatable during use) and the single-split cage 102 is used to guide the end faces thereof, the thick sections 144a and 144b can be allowed to interfere along the fringe of the inner track formed into the concave shape, and the single-split cage 102 can be effectively prevented from riding over the outer circumferential face of the inner member. As a result, not only the single-split cage 102 but also a bearing can be configured without being limited in the configuration of the peripheral sections of the bearing.

Furthermore, the thin sections 142a and 142b and the thick sections 144a and 144b are disposed on the rim sections 104a and 104b and do not affect the configuration of the pillar sections 106 particularly. Hence, the pillar sections 106 can be made more slender. In other words, in the case that the same number of rollers are held in the single-split cage 102 having the same diameter, the pillar sections 106 become more slender as the roller diameter becomes larger; even in this case, it is not difficult to expand the crack section 120 (in other words, it is not difficult to increase the diameter of the single-split cage 102). As a result, the roller diameter can be made larger without decreasing the number of the rollers to be held in the single-split cage 102, and the load capacity of the bearing can be improved.

As described above, the sizes, shapes, numbers and disposition intervals of the thin sections 142a and 142b and the thick sections 144a and 144b can be set as desired, provided that at least the thin sections 142a and 142b are disposed at the start points 140a and 140b of the pair of rim sections 104a and 104b, and the configurations of the thin sections 142a and 142b and the thick sections 144a and 144b are not limited to those of this embodiment (FIG. 13).

Figure 14:
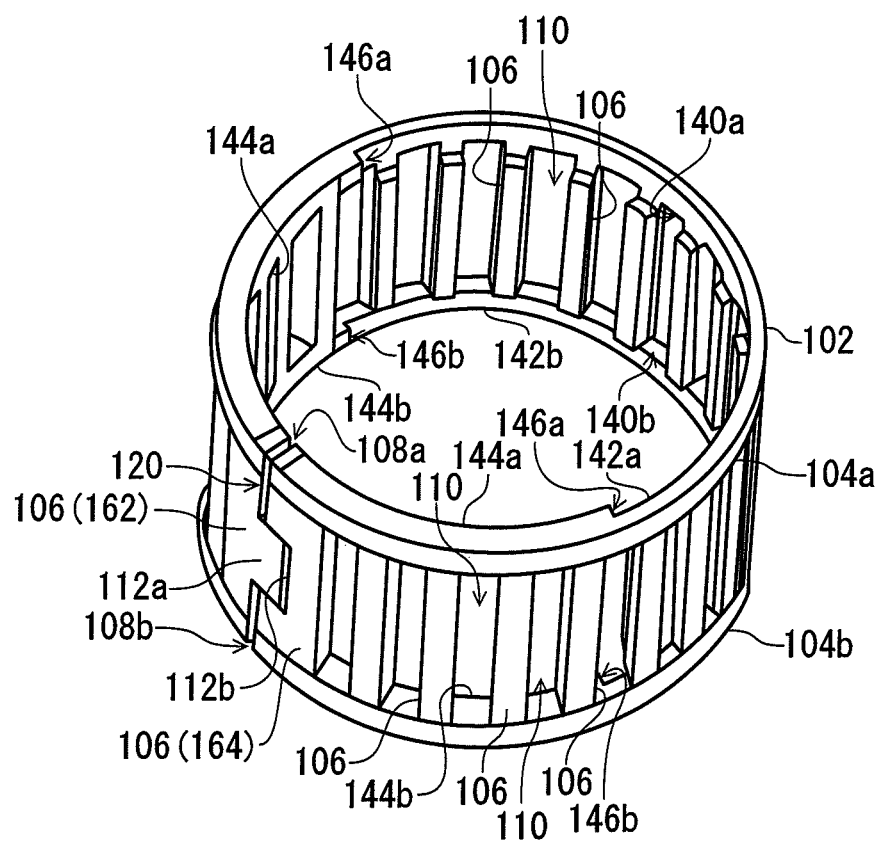
FIG. 14 is a perspective view showing an entire configuration of a radial roller bearing cage (single-split cage) according to a third embodiment of the present invention.
Figure 15:
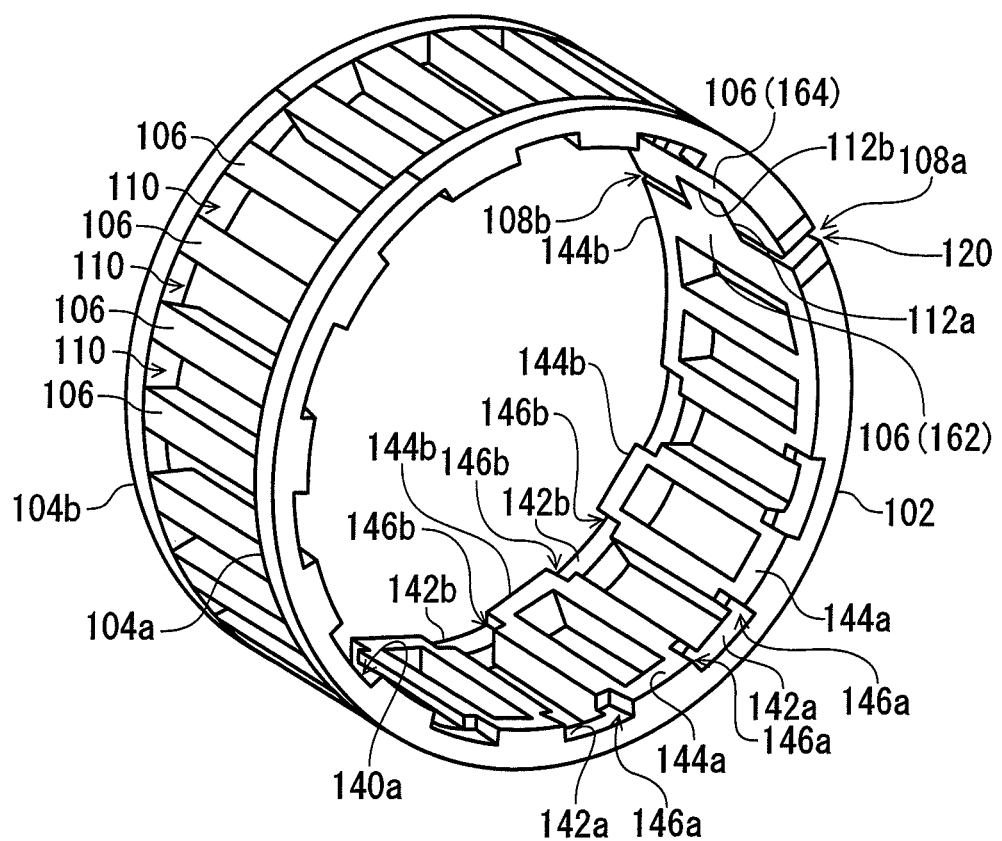
FIG. 15 is a perspective view showing an entire configuration of a radial roller bearing cage (single-split cage) according to a fourth embodiment of the present invention.

For example, as in a third embodiment of the present invention shown in FIG. 14, it may be possible to use a configuration in which the thin sections 142a and 142b and the thick sections 144a and 144b are disposed, one each, or as in a fourth embodiment of the present invention shown in FIG. 15, it may be possible to use a configuration in which the thin sections 142a and 142b and the thick sections 144a and 144b are disposed, ten each.

In the third embodiment, as shown in FIG. 14, each one of the thin sections 142a and 142b is disposed on the side of the start points 140a and 140b, and each one of the thick sections 144a and 144b is disposed on the side of the deficit sections 108a and 108b so as to be continuous with the thin sections 142a and 142b. In other words, in the inner circumferential sections of the pair of rim sections 104a and 104b, only the start-point thin sections 142a and 142b and the deficit-section-adjacent thick sections 144a and 144b are disposed on both the rim sections 104a and 104b so as to be symmetric in the circumferential direction, and the steps 146a and 146b are formed at the boundaries of the start-point thin sections 142a and 142b and the deficit-section-adjacent thick sections 144a and 144b. At the time, the steps 146a and 146b are positioned not on the pillar sections 106 but on the pockets 110 of the rim sections 104a and 104b.

Furthermore, in the fourth embodiment, as shown in FIG. 15, the thin sections 142a and 142b including the start-point thin sections 142a and 142b, ten each in total, are disposed at nearly equal intervals on both sides in the circumferential direction from the start-point thin sections 142a and 142b, and the thick sections 144a and 144b are disposed between the thin sections 142a and 142b adjacent to each other in the circumferential direction, one each, whereby the thick sections 144a and 144b including the deficit-section-adjacent thick sections 144a and 144b, ten each in total, are disposed. In this case, the thin sections 142a and 142b (the start-point thin sections 142a and 142b) are disposed so as to be continuous while having a constant diameter (the same diameter) and striding over one pocket 110 (in other words, a roller) and two pillar sections 106 and so as to skip each one of the pockets 110 (rollers) adjacent to each other on both sides of the pair of rim sections 104a and 104b in the circumferential direction. In other words, the boundaries (in other words, the steps 146a and 146b) of the thin sections 142a and 142b (the start-point thin sections 142a and 142b) and the thick sections 144a and 144b (the deficit-section-adjacent thick sections 144a and 144b) are positioned at the portions (on the pillar sections 106 of the rim sections 104a and 104b) in which the pair of rim sections 104a and 104b is connected by the pillar sections 106.

As described above, the boundaries (the steps 146a and 146b) of the thin sections 142a and 142b (the start-point thin sections 142a and 142b) and the thick sections 144a and 144b (the deficit-section-adjacent thick sections 144a and 144b) are positioned not on the pockets 110 but on the pillar sections 106 of the rim sections 104a and 104b; hence, in the case that the entire single-split cage 102, that is, the rim sections 104a and 104b (the thin sections 142a and 142b and the thick sections 144a and 144b) and the pillar sections 106 are integrally injection molded, the mating faces of the metal mold thereof are positioned on the cross sections of the pillar sections 106, whereby the influence of burrs generated during molding can be suppressed in comparison with a case in which the boundaries (the steps 146a and 146b) are positioned on the pockets 110 in the rim sections 104a and 104b as in the second embodiment (FIG. 13) and the third embodiment (FIG. 14).

In the above-mentioned second embodiment (FIG. 13) and the third embodiment (FIG. 14), it is possible to have a configuration in which the boundaries (the steps 146a and 146b) are positioned not on the pockets 110 but on the pillar sections 106 of the rim sections 104a and 104b.

Figure 16:
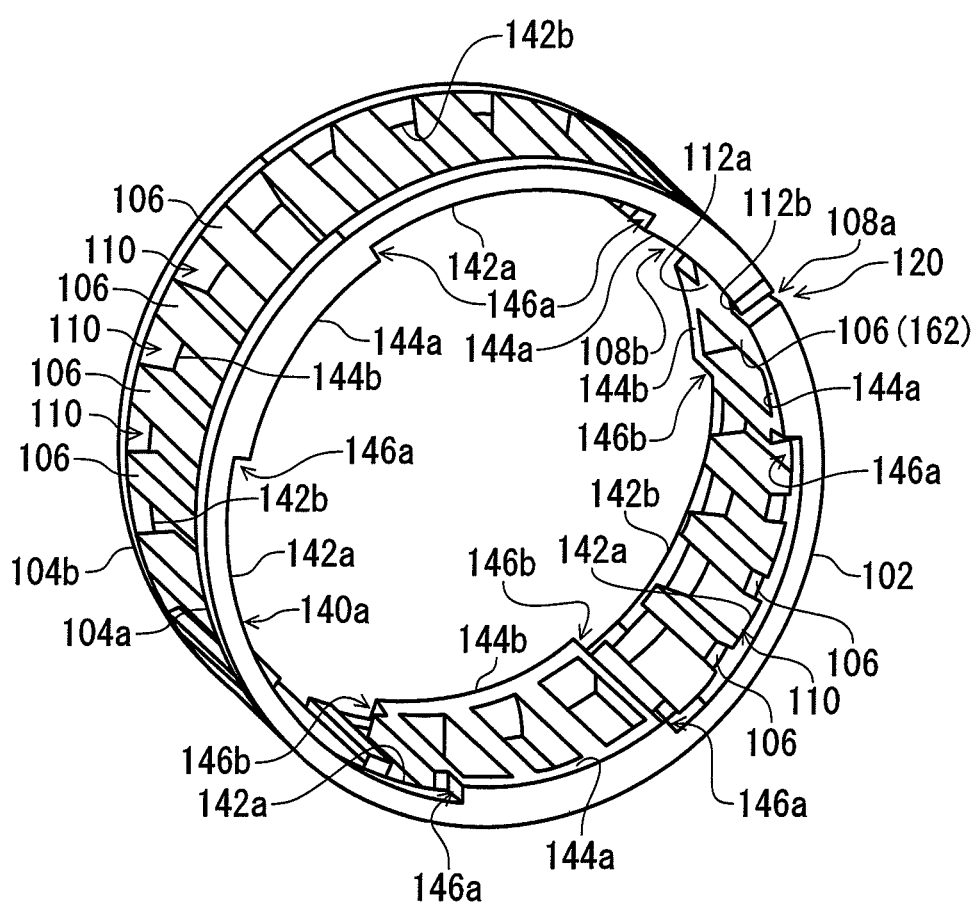
FIG. 16 is a perspective view showing an entire configuration of a radial roller bearing cage (single-split cage) according to a fifth embodiment of the present invention.

In the single-split cage 102 in which the thin sections 142a and 142b and the thick sections 144a and 144b, three each, are disposed as in the case of the above-mentioned second embodiment (FIG. 13), a configuration example in which the boundaries (the steps 146a and 146b) thereof are positioned not on the pockets 110 but on the pillar sections 106 of the rim sections 104a and 104b is shown in FIG. 16 as a fifth embodiment of the present invention.

The single-split cage 102 according to the second embodiment to the fifth embodiment described above (FIG. 13 to FIG. 16) is capable of allowing the split section 120 to be expanded easily and sufficiently and capable of effectively preventing from riding over inner members (an inner ring, a shaft, etc. being rotatable during use) while avoiding the deterioration in strength and the reduction in the number of rollers to be held.

Furthermore, in the second embodiment to the fifth embodiment described above (FIG. 13 to FIG. 16), the steps 146a and 146b are formed at the boundaries of the thin sections 142a and 142b (the start-point thin sections 142a and 142b) and the thick sections 144a and 144b (the deficit-section-adjacent thick sections 144a and 144b) being adjacent to each other in the circumferential direction, and the thin sections 142a and 142b and the thick sections 144a and 144b are arranged alternately on the inner circumferential portions of the pair of rim sections 104a and 104b in the circumferential direction; however, instead of forming the steps 146a and 146b at the boundaries, it is possible to assume a configuration in which the thin sections 142a and 142b (the start-point thin sections 142a and 142b) and the thick sections 144a and 144b (the deficit-section-adjacent thick sections 144a and 144b) are formed continuously.

Figure 17A:
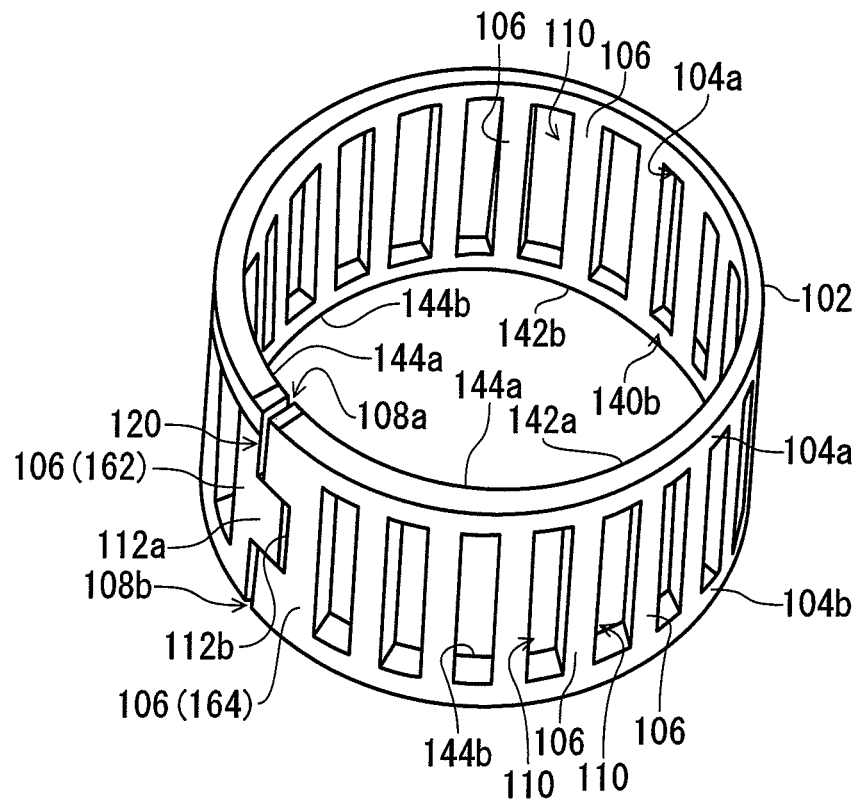
FIGS. 17A and 17B are perspective views showing an entire configuration of a radial roller bearing cage (single-split cage) according to a sixth embodiment of the present invention.
Figure 17B:
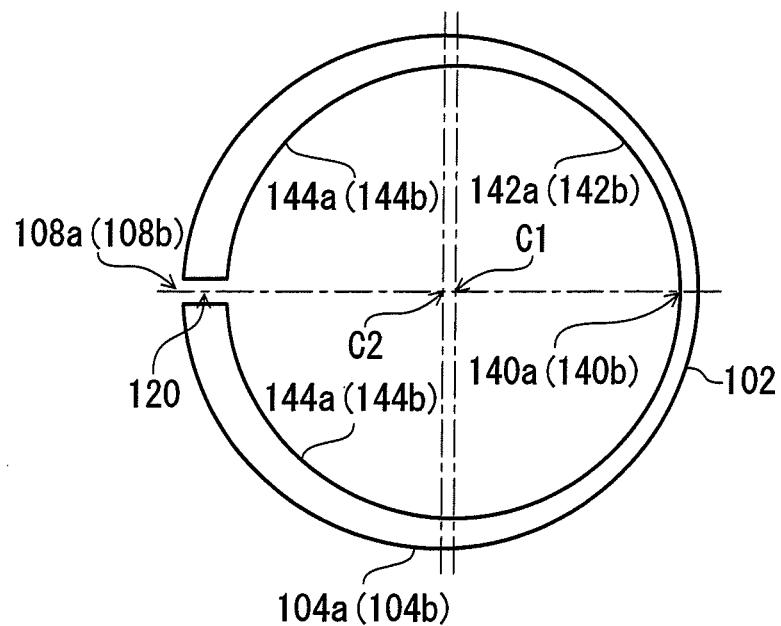

The configuration in which the thin sections 142a and 142b (the start-point thin sections 142a and 142b) and the thick sections 144a and 144b (the deficit-section-adjacent thick sections 144a and 144b) are formed continuously without steps is shown in FIGS. 17A and 17B as a sixth embodiment of the present invention.

In this embodiment, the thin sections 142a and 142b and the thick sections 144a and 144b are formed continuously without steps such that the inner diameter is decreased gradually from the thinnest portions of the thin sections 142a and 142b to the thickest portions of the thick sections 144a and 144b (FIGS. 17A and 17B. Since the thin sections 142a and 142b and the thick sections 144a and 144b are formed continuously without steps as described above, the center C1 of the imaginary inner circumferential circle and the center C2 of the imaginary outer circumferential circle obtained by continuing the deficit sections 108a and 108b of the rim sections 104a and 104b are in a state of being dislocated from each other, that is, the two circles are in a state of being eccentric from each other (FIG. 17B). In the configuration of this kind of cage 102, the thinnest portions in which the thin sections 142a and 142b become thinnest in the radial direction correspond to the start-point thin sections 142a and 142b, and the thickest portions in which the thick sections 144a and 144b become thickest in the radial direction correspond to the deficit-section-adjacent thick sections 144a and 144b.

In this embodiment, the steps 146a and 146b (FIG. 13 to FIG. 16) are not formed at the boundaries of the thin sections 142a and 142b and the thick sections 144a and 144b being adjacent to each other in the inner circumferential sections of the rim sections 104a and 104b; however, the thicknesses of the inner circumferential sections of the rim sections 104a and 104b in the radial direction can be prevented from becoming uniform along the entire circumferences and can thus be changed. Hence, for example, even in the case that an inner track is formed into a concave shape on the outer circumferential face of an inner member (an inner ring, a shaft, etc. being rotatable during use) and the single-split cage 102 is used to guide the end faces thereof, any regions of the inner circumferential sections of the rim sections 104a and 104b extending from the start-point thin sections 142a and 142b to the deficit-section-adjacent thick sections 144a and 144b can be allowed to interfere along the fringe of the inner track formed into the concave shape, and the single-split cage 102 can be effectively prevented from riding over the outer circumferential face of the inner member. As a result, not only the single-split cage 102 but also a bearing can be configured without being limited in the configuration of the peripheral sections of the bearing, as in the second embodiment to the fifth embodiment (FIG. 13 to FIG. 16) described above.

The radial roller bearing cage according to the present invention will be described below referring to the accompanying drawings. It is possible to assume that bearings or the like for journaling rotating systems in power mechanisms (an automobile transmission as an example) provided for automobiles, railroad vehicles, etc. are used as bearings in which the radial roller bearing cage according to the present invention is incorporated; however, the bearings are not limited to these bearings.

Such a bearing is equipped with an outer member (for example, an outer ring or a housing being maintained in a non-rotating state at all times, or a gear, a roller, etc. being rotatable during use) having a cylindrical outer track on the inner circumferential face thereof; and a plurality of radial rollers (a plurality of needles as an example) incorporated so as to be able to roll between the outer circumferential face (inner track) of the inner member (for example, an inner ring, a shaft, etc. being rotatable during use) disposed on the inner diameter side of the outer member and the outer track. The size of the bearing, the presence or absence of the inner ring, the size (diameter and length) and the number of the rollers, etc. can be set as desired depending on the use conditions, the intended use of the bearing, etc., thereby not limited particularly herein.

In addition, when these rollers roll between the tracks (the outer track and the inner track), the rollers are held by the bearing cage so as to be rotatable inside the pockets thereof to prevent the increase in rotational resistance, seizure, etc. caused by the friction due to mutual contact between the rollers. Bearing lubrication (oil lubrication or grease lubrication) may be performed to further effectively prevent the increase in rotational resistance, seizure, etc. In addition, the bearing cage can also be configured as a guide system for all of rolling element guidance (roller guidance), outer ring guidance and inner ring guidance.

Figure 18:
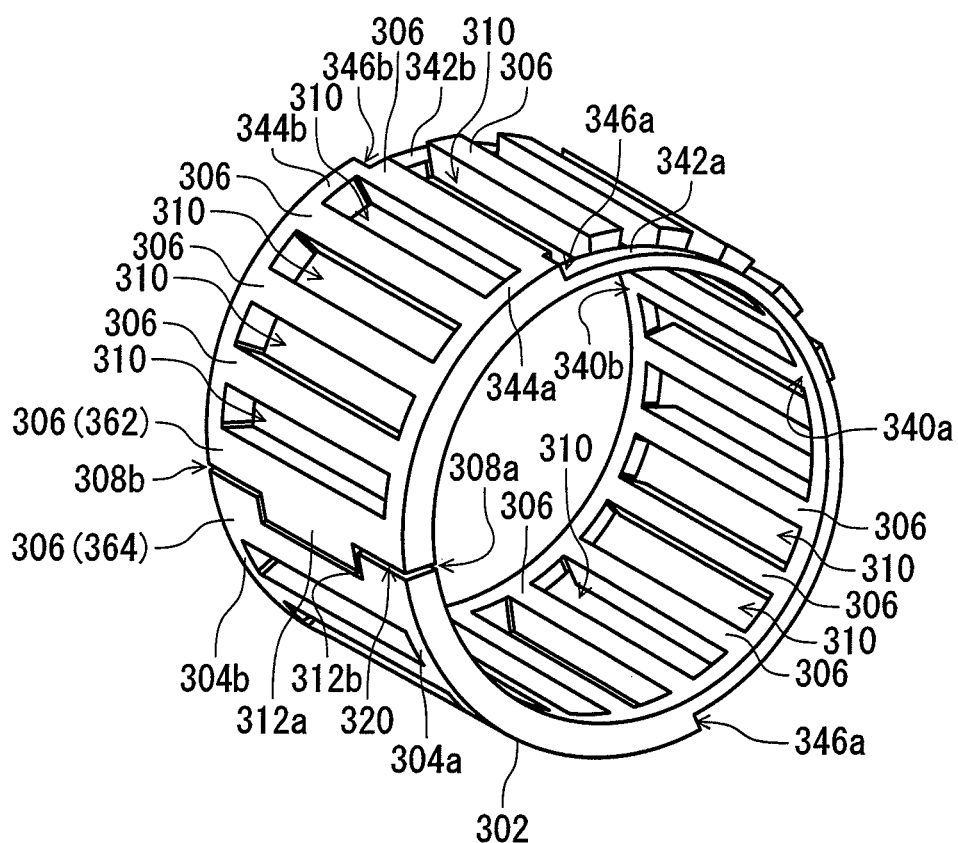
FIG. 18 is a perspective view showing an entire configuration of a radial roller bearing cage (single-split cage) according to a seventh embodiment of the present invention.

FIG. 18 shows the configuration of a radial roller bearing cage (hereafter simply referred to as a cage) 302 according to a seventh embodiment of the present invention. In this embodiment, it is assumed that the cage 302 is made of a predetermined elastic material (a resin as an example) and that the whole of the cage (rim sections 304a and 304b and pillar sections 306 described later) is integrally molded by injecting the elastic material into a metal mold (injection molding); however, this does not eliminate the possibility of performing molding using other known methods. Furthermore, it may be possible that a molded body obtained after injection molding is subjected to cutting, grinding, etc. separately to form the cage 302 as a completed product.

The cage 302 is configured so as to be equipped with a pair of circular ring sections 304a and 304b and a plurality of pillar sections 306. Each of the pair of rim sections 304a and 304b has a discontinuous incomplete ring shape (nearly C-shaped), respectively having deficit sections 308a and 308b, each at one portion, and the deficit sections 308a and 308b of the rim sections 104a and 104b are disposed coaxially so as to be opposed to each other with a predetermined clearance provided therebetween in the axial direction in a state in which the deficit sections 308a and 308b have the same phase in the circumferential direction (in a state in which the positions of the deficit sections 308a and 308b in the circumferential direction are coincident with each other). In other words, the cage 302 has, as an appearance profile, a nearly cylindrical shape (the so-called single-split cage structure) having a single split section 320 in the circumferential direction. The diameter of the rim section 304a and the rim section 304b and the distance between the opposed rim sections in the axial direction should only be set as desired depending on the size of the bearing, etc.

The plurality of pillar sections 306 are used to connect the pair of rim sections 304a and 304b in the axial direction and to separate the region between the rim sections 304a and 304b in the circumferential direction of the rim sections 304a and 304b, thereby forming pockets 310 for allowing rollers (needles) (not shown) serving as rolling elements to be inserted and held rotatably. In other words, a single pocket 310 is formed in the space enclosed by the two pillar sections 306 being adjacent to each other in the circumferential direction and the pair of rim sections 304a and 304b. Hence, the cage 302 has a structure in which the pillar sections 306 and the pockets 310 are disposed alternately in the circumferential direction. However, in the region between the rim sections 304a and 304b separated by the two pillar sections 306 (hereafter referred to as deficit-section-adjacent pillar sections 362 and 364) disposed close to both the circumferential sides of the deficit sections 308a and 308b of the rim sections 304a and 304b, the crack section 320 is present, and no pocket 310 is formed. Hence, the cage 302 has a structure in which a roller is lacking only in this region (that is, the crack section 320); in other words, the cage has a structure in which in the regions other than this region, the rollers are inserted into the pockets, one by one, and the rollers are disposed at equal intervals (at equal pitches) in the circumferential direction.

The size of the pocket 310 formed by the pillar sections 306 should only be set depending on the diameter and length of the roller so that the roller can be held so as to be rotatable in the pockets 310, and the number of the pockets 310 (the number of the pillar sections 306 from a different point of view) should only be set as desired depending on the capacity (the number of the rollers to be held) of the cage 302. In addition, the shape (the surface shape of the circumferentially opposed faces of the adjacent pillars 306 from a different point of view) of the pocket face (the face making contact with the circumferential face of the roller) should only be formed into a concave curved shape (for example, a concave curved shape having a curvature slightly smaller than that of the circumferential face of the roller). In the peripheral section of the pocket 310, it is possible to provide protruding sections (for example, claw-shaped protrusions for grasping the roller) for narrowing the opening of the pocket so that the roller inserted into the pocket 310 is held so as not to drop off.

With the above-mentioned structure (the so-called single-split cage structure) in which the deficit sections 308a and 308b are formed in the pair of rim sections 304a and 304b, one each, and the cage 302 has one crack section 320 in the circumferential direction, when a force is exerted in a direction in which the crack section 320 of the cage 302 is expanded or, from a different point of view, in a direction in which both the end faces (the opposed faces of the deficit sections 308a and 308b) of the respective rim sections 304a and 304b are separated from each other, the cage 302 is entirely deformed elastically. As a result, the crack section 320 (the deficit sections 308a and 308b) can be expanded; in other words, the diameter of the cage 302 (in short, the rim sections 304a and 304b) can be increased. Furthermore, when a force is exerted in a direction in which the crack section 320 is shrunk from this state or, from a different point of view, in a direction in which both the end faces (the opposed faces of the deficit sections 308a and 308b) of the respective rim sections 304a and 304b are brought close to each other, the cage 302 is entirely deformed elastically to its original state before the expansion. As a result, the crack section 320 (the deficit sections 308a and 308b) can be shrunk to its original state; in other words, the diameter of the cage 302 (in short, the rim sections 304a and 304b) can be decreased to its original diameter (the diameter before the expansion). It is possible to assume a cage configuration in which the diameter of the cage 302 is decreased and returned to the original diameter (the diameter before the expansion) by using only the elastic restoring force of the cage 302 generated by relieving the force exerted in the direction in which the crack section 320 is expanded, without exerting a force in the direction in which the crack section 320 of the cage 302 is made shrunk, or by exerting a force in the direction of shrinkage in addition to the elastic restoring force.

Hence, the diameter of the cage 302 can be made increased and decreased as desired, whereby a bearing can be mounted on a rotation shaft having step sections, flange sections, etc. of various sizes. After the bearing is mounted on the rotation shaft, the crack section 320 (the deficit sections 308a and 308b) of the cage 302 is required to be prevented from being expanded again so that the cage 302 does not drop off and is not dislocated. In other words, the diameter of the pair of rim sections 304a and 304b can be maintained constant and the diameter of the cage 302 can be maintained steady by preventing the expansion (in short, re-expansion) of the deficit sections 308a and 308b.

FIG. 18 shows a configuration example of the cage 302 equipped with an engagement section formed of a convex section 312a and a concave section 312b fitted to each other as an engagement mechanism. In this case, the one side (the deficit-section-adjacent pillar section 362 as an example) of the deficit-section-adjacent pillar sections 362 and 364 being adjacent to each other with the crack section 320 located therebetween and disposed so as to be opposed to each other is provided with a convex section 312a, and the other side (the deficit-section-adjacent pillar section 364 as an example) is provided with a concave section 312b. The convex section 312a protrudes, while having a predetermined shape and a predetermined size (length), from the face of the deficit-section-adjacent pillar section 362 opposed to the deficit-section-adjacent pillar section 364 in the circumferential direction, and the concave section 312b is cut off, while having a predetermined shape and a predetermined size (depth in the circumferential direction), from the inner diameter side to the outer diameter side at the portion of the deficit-section-adjacent pillar section 364 opposed to the deficit-section-adjacent pillar section 362 so that the concave section 312b can be fitted on the convex section 312a. The shapes and sizes (length and depth) of the convex section 312a and the concave section 312b are not limited particularly, and should only be set as desired depending on the material, the size (diameter and width) of the cage 302, provided that they can be fitted into each other. Furthermore, the engagement mechanism is not limited to the mechanism formed of the convex section 312a and the concave section 312b capable of being fitted into each other, but can be modified as necessary to known various kinds of mechanisms, provided that the crack section 320 (the deficit sections 308a and 308b) of the cage 302 can be suppressed from being expanded again.

In this embodiment, the pair of rim sections 304a and 304b has thin sections 342a and 342b being thin in the radial direction, the diameter of the outer circumferential sections of which is made smaller than that of the outer circumferential section of the pillar section 306, and also has thick sections 344a and 344b being thick in the radial direction, the diameter of which is made larger than that of the thin sections 342a and 342b. Furthermore, the thin sections 342a and 342b are disposed at portions positioned on the opposite side of the deficit sections 308a and 308b with respect to the center of the outer circumferential sections of the pair of rim sections 304a and 304b, in other words, portions dislocated from the deficit sections 308a and 308b by 180° in phase in the circumferential direction (the portions designated by 340a and 340b in FIG. 18, hereafter referred to as start points 340a and 340b). Since the thin sections 342a and 342b and the thick sections 344a and 344b are disposed in the outer circumferential sections of the pair of rim sections 304a and 304b as described above, when a force is exerted in a direction in which the crack section 320 of the cage 302 is expanded (in a direction in which both the circumferential end faces (the opposed faces of the deficit sections 308a and 308b) of the rim sections 304a and 304b are separated from each other), the thin sections 342a and 342b can be elastically deformed significantly earlier than the thin sections 342a and 342b, whereby the entire cage 302 can be elastically deformed easily. Hence, the crack section 320 (the deficit sections 308a and 308b) can be expanded easily, that is, the cage 302 can be increased easily in diameter.

The inner circumferential sections of the pair of rim sections 304a and 304b are not made smaller or larger in diameter than the inner circumferential sections of the pillar sections 306, and the diameter thereof is set so as to be constant (the same as the inner diameter at the pillar sections 306) along the entire circumference. In other words, the cage 302 according to this embodiment has a configuration suited as a cage for inner ring guidance.

The sizes, shapes, numbers and disposition intervals of the thin sections 342a and 342b and the thick sections 344a and 344b are not limited particularly and can be set as desired, provided that at least the thin sections 342a and 342b are disposed at the start points 340a and 340b of the pair of rim sections 304a and 304b.

For example, in FIG. 18, the thin sections 342a and 342b are disposed on the sides of the start points 340a and 340b, one each, and the thick sections 344a and 344b are disposed on the sides of the deficit sections 308a and 308b, one each, so as to be disposed continuously to the thin sections 342a and 342b. In other words, on the outer circumferential sections of the pair of rim sections 304a and 304b, only the thin sections 342a and 342b and the thick sections 344a and 344b are disposed so as to be symmetric in the circumferential direction at both the rim sections 304a and 304b, and the steps 346a and 346b are formed at the boundaries of the thin sections 342a and 342b and the thick sections 344a and 344b. At the time, the steps 346a and 346b, that is, the boundaries of the thin sections 342a and 342b and the thick sections 344a and 344b, are positioned at the portions (on the pillar sections 306 of the rim sections 304a and 304b) in which the pair of rim sections 304a and 304b is connected by the pillar sections 106.

The boundaries (the steps 346a and 346b) of the thin sections 342a and 342b and the thick sections 344a and 344b are positioned not on the pockets 310 but on the pillar sections 306 of the rim sections 304a and 304b; hence, in the case that the entire cage 302, that is, the rim sections 304a and 304b (the thin sections 342a and 342b and the thick sections 344a and 344b) and the pillar sections 306 are integrally injection molded, the mating faces of the metal mold therefor are positioned on the cross sections of the pillar sections 306, whereby the influence of burrs generated during molding can be suppressed in comparison with a case in which the boundaries (the steps 346a and 346b) are positioned on the pockets 310 of the rim sections 304a and 304b. However, it is possible to assume a configuration in which the steps 346a and 346b are positioned not on the pillar sections 306 but on the pockets 310 of the rim sections 304a and 304b.

Still further, the thin section 342a of the rim section 304a and the thin section 342b of the rim section 304b are disposed while having the same phase in the circumferential direction; and the thick section 344a of the rim section 304a and the thick section 344b of the rim section 304b are also disposed while having the same phase in the circumferential direction. In other words, the thin section 342a and the thick section 344a are disposed so as to be symmetric with the thin section 342b and the thick section 344b in the circumferential direction at both the rim sections 304a and 304b.

The thin sections 342a and 342b and the thick sections 344a and 344b are disposed in the outer circumferential regions of the rim sections 304a and 304b continuously striding over the plurality of pillar sections 306 and pockets 310 (in other words, rollers), and the boundaries of the thin sections 342a and 342b and the thick sections 344a and 344b, that is, the steps 346a and 346b, are positioned on the pillar sections 306 in the rim sections 304a and 304b. At the time, the thin sections 342a and 342b respectively stride over the plurality of pillar sections 306 and pockets 310 (in other words, rollers) continuously while having a constant diameter (the same diameter); and the thick sections 344a and 344b also respectively stride over the plurality of pillar sections 306 and pockets 310 (in other words, rollers) continuously while having a constant diameter (the same diameter). More specifically, the thin sections 342a and 342b and the thick sections 344a and 344b are respectively formed continuously along the predetermined regions while respectively having constant thicknesses in the circumferential direction, and the thin sections 342a and 342b are formed continuously along the predetermined regions while having a thickness smaller than that of the thick sections 344a and 344b in the radial direction.

The thin sections 342a and 342b are positioned so that the intermediate portions thereof in the circumferential direction are nearly aligned with the start points 340a and 340b. Furthermore, although the thick sections 344a and 344b are divided into two parts at the deficit sections 308a and 308b, in the case that these two parts are assumed to be one, the thick sections are assumed to be continuous along the predetermined regions.

In this embodiment, the thin sections 342a and 342b are disposed continuously while striding over the plurality of pillar sections 306 and pockets 310 (in other words, rollers) as described above, whereby when the split section 320 is expanded, the stress of the force exerted to the cage 302 can be exerted while being distributed to the entire thin sections 342a and 342b and can thus be relieved. Hence, the stress can be effectively avoided from being exerted concentratedly to specific portions being limited extremely in the rim sections 304a and 304b and the pillar sections 306.

Furthermore, the thin sections 342a and 342b and the thick sections 344a and 344b are disposed in the outer circumferential sections of the rim sections 304a and 304b, and the steps 346a and 346b are formed at the boundaries of the thin sections 342a and 342b and the thick sections 344a and 344b being adjacent to each other. As a result, the thicknesses of the outer circumferential sections of the rim sections 304a and 304b in the radial direction can be prevented from being uniform along the entire circumferences and can thus be changed. Hence, for example, even in the case that an outer track is formed into a concave shape on the inner circumferential face of an outer member (an outer ring or a housing being maintained in a non-rotating state at all times, or a gear, a roller, etc. being rotatable during use) and the cage 302 is used to guide the end faces thereof, the thick sections 344a and 344b can be allowed to interfere along the fringe of the outer track formed into the concave shape, and the cage 302 can be effectively prevented from riding over the inner circumferential face of the outer member. As a result, not only the cage 302 but also a bearing can be configured without being limited in the configuration of the peripheral sections of the bearing.

Furthermore, the thin sections 342a and 342b and the thick sections 344a and 344b are disposed on the rim sections 304a and 304b and do not affect the configuration of the pillar sections 306 particularly. Hence, the pillar sections 306 can be made more slender. In other words, in the case that the same number of rollers are held in the cage 302 having the same diameter, the pillar sections 306 become more slender as the roller diameter becomes larger; even in this case, it is not difficult to expand the crack section 320 (in other words, it is not difficult to increase the diameter of the cage 302). As a result, the roller diameter can be made larger without decreasing the number of the rollers to be held in the cage 302, and the load capacity of the bearing can be improved.

As described above, the sizes, shapes, numbers and disposition intervals of the thin sections 342a and 342b and the thick sections 344a and 344b can be set as desired, provided that at least the thin sections 342a and 342b are disposed at the start points 340a and 340b of the pair of rim sections 304a and 304b, and the configurations of the thin sections 342a and 342b and the thick sections 344a and 344b are not limited to those of this embodiment (FIG. 18).

For example, it may be possible to use a cage configuration in which the thin sections and the thick sections are disposed, two or more each (three each as an example). In this case, it is preferable that the thin sections are disposed one by one at nearly equal intervals on both sides in the circumferential direction from the thin sections positioned at the start points 340a and 340b, and that the thick sections are disposed one by one between the thin sections adjacent to each other in the circumferential direction. In other words, a configuration should only be used in which a plurality of thin sections and a plurality of thick sections (the same number as an example) are arranged alternately one by one in the circumferential direction on the outer circumferential sections of the rim sections 304a and 304b, and steps are formed at the boundaries between the thin sections and the thick sections adjacent to each other in the circumferential direction. In this case, the plurality of thin sections of the rim section 304a and the plurality (as many as the thin sections of the rim section 304a) of thin sections of the rim section 304b are disposed while having the same phase in the circumferential direction, and the plurality (as many as the thin sections of the rim section 304a) of thick sections of the rim section 304a and the plurality (as many as the thick sections (thin sections) of the rim section 304a) of thick sections of the rim section 304b are also disposed while having the same phase in the circumferential direction. In other words, the thin sections and the thick sections should only be disposed so as to be symmetric in the circumferential direction at both the rim sections 304a and 304b.

Furthermore, in the above-mentioned first embodiment (FIG. 18), the outer circumferential sections of the pair of rim sections 304a and 304b are made smaller in diameter than the outer circumferential sections of the pillar sections 306, whereby the thin sections 342a and 342b are made thin in the radial direction; furthermore, it is possible to have a configuration in which the inner circumferential sections of the pair of rim sections 304a and 304b are made larger in diameter than the inner circumferential sections of the pillar sections 306, whereby the thin sections 342a and 342b are made thinner than the thick sections 344a and 344b on both the outer diameter sides and the inner diameter sides in the radial direction.

Figure 19:
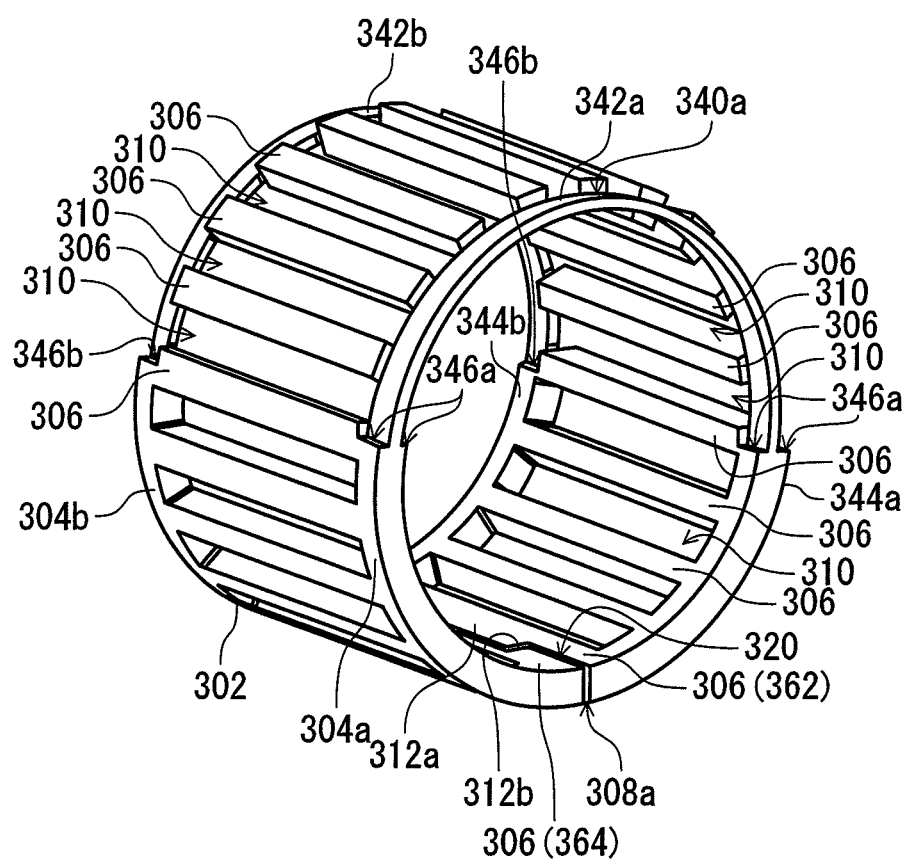
FIG. 19 is a perspective view showing an entire configuration of a radial roller bearing cage (single-split cage) according to an eighth embodiment of the present invention.

By making the outer circumferential sections of the pair of rim sections 304a and 304b smaller in diameter than the outer circumferential sections of the pillar sections 306 and by making the inner circumferential sections thereof larger in diameter than the inner circumferential sections of the pillar sections 306 as described above, the configuration of the cage 302 having the thin sections 342a and 342b being dented on both the outer diameter sides and the inner diameter sides in the radial direction and made thinner than the thick sections 344a and 344b is obtained and shown in FIG. 19 as an eighth embodiment of the present invention. The cage 302 according to this embodiment has a configuration suited as a cage for rolling element guidance (roller guidance).

In this case, the pair of rim sections 304a and 304b is configured in which the inner circumferential sections thereof are increased in diameter uniformly (along the same width (circumferential range) and continuously formed while having a constant diameter (the same diameter) so that the inner circumferential sections correspond to the decreased diameter portions of the outer circumferential sections, that is, have the same phase in the circumferential direction. At the time, the decreased diameter portion of the outer circumferential section and the increased diameter portion of the inner circumferential section (that is, the thin section 342a) of the rim section 304a and the decreased diameter portion of the outer circumferential portion and the increased diameter portion of the inner circumferential section (that is, the thin section 342b) of the rim section 304b are both disposed so as to have the same phase in the circumferential direction. Hence, as in the seventh embodiment (FIG. 18) described above, the thin section 342a is symmetric with the thick section 344a and the thin section 342b is symmetric with the thick section 344b in the circumferential direction at both the rim sections 304a and 304b. At the time, the steps 346a and 346b are formed at the boundaries of the thin sections 342a and 342b and the thick sections 344a and 344b not only in the outer circumferential sections but also in the inner circumferential sections of the pair of rim sections 304a and 304b, and these steps 346a and 346b are positioned at portions (on the pillar sections 306 of the rim sections 304a and 304b) where the pair of rim sections 304a and 304b is connected by the pillar sections 306 while having the same phase in the circumferential direction (however, the steps can also be positioned on the pockets 310 of the rim sections 304a and 304b).

The decreased diameter of the outer circumferential sections and the increased diameter of the inner circumferential sections of the pair of rim sections 304a and 304b are not limited particularly; the amount of diameter decrease and the amount of diameter increase may have the same dimension (in a state in which the thick sections 344a and 344b are dented in the radial direction on both the outer diameter sides and the inner diameter sides by the same dimension), or the amount of diameter decrease and the amount of diameter increase may have different dimensions (in a state in which the thick sections 344a and 344b are dented in the radial direction on both the outer diameter sides and the inner diameter sides by different dimensions).

Furthermore, in the case of a cage configuration in which the thin sections 342a and 342b and the thick sections 344a and 344b are disposed, two or more each, the inner circumferential sections of the rim sections 304a and 304b should only be respectively increased in diameter so as to correspond to the respective diameter-decrease portions of the outer circumferential sections (so as to have the same phase in the circumferential direction). Hence, the thin sections 342a and 342b and the thick sections 344a and 344b are disposed alternately on the inner circumferential sections of the rim sections 304a and 304b as in the case of the outer circumferential sections, whereby the steps 346a and 346b are formed at the boundaries of the thin sections 342a and 342b and the thick sections 344a and 344b adjacent to each other.

Figure 20:
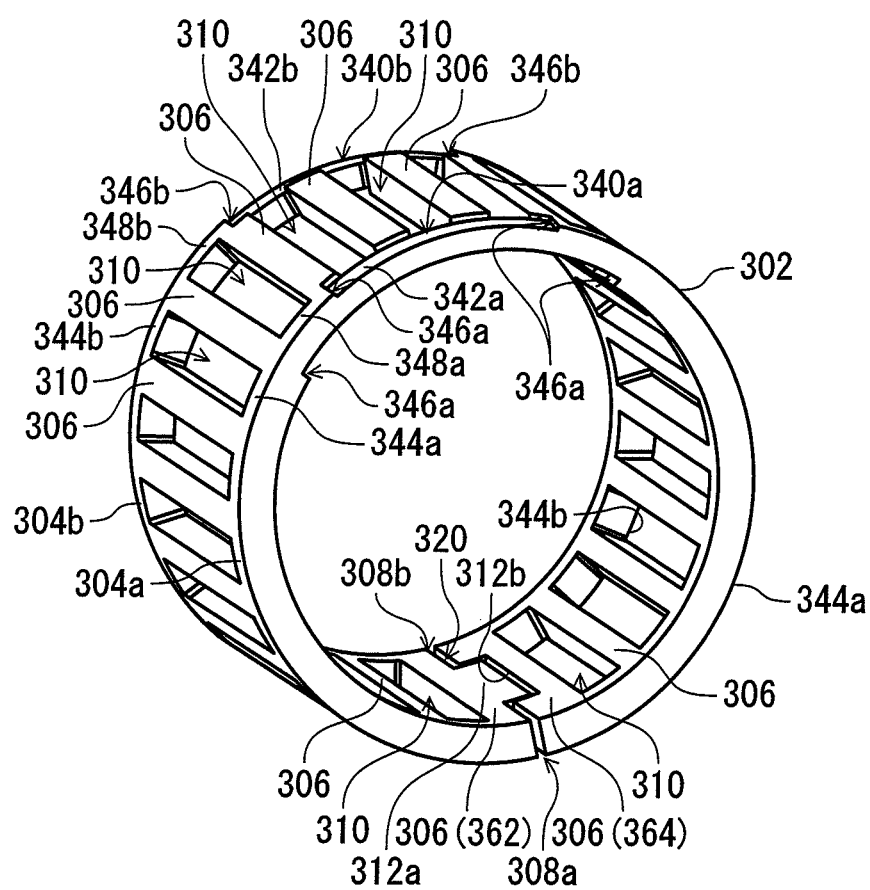
FIG. 20 is a perspective view showing an entire configuration of a radial roller bearing cage (single-split cage) according to a ninth embodiment of the present invention.
Figure 21:
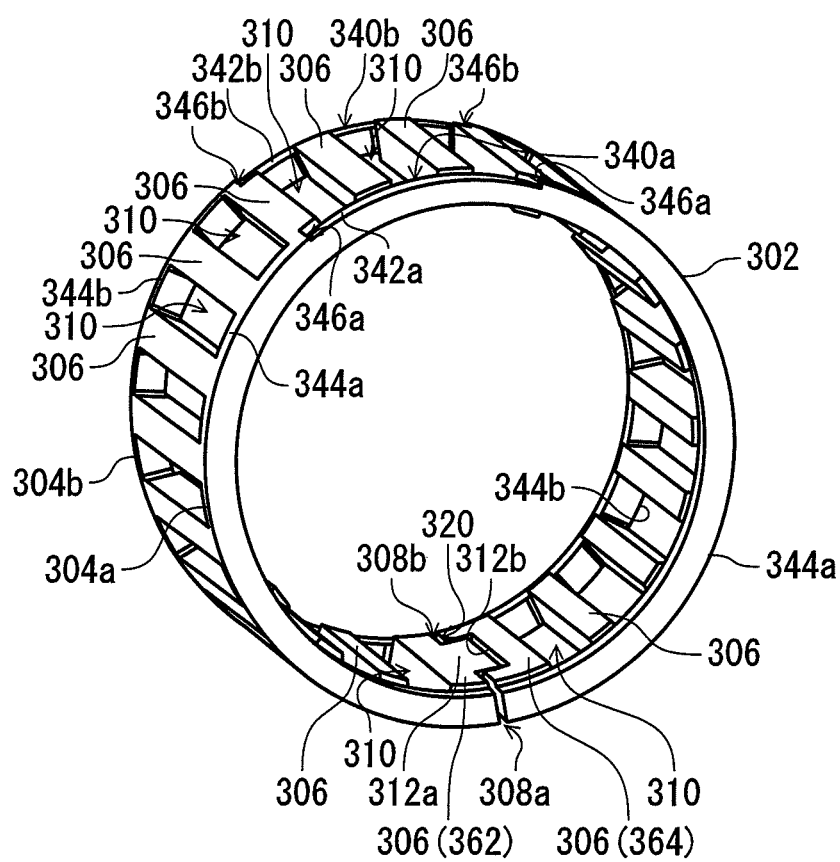
FIG. 21 is a perspective view showing an entire configuration of a radial roller bearing cage (single-split cage) according to a tenth embodiment of the present invention.
Figure 22:
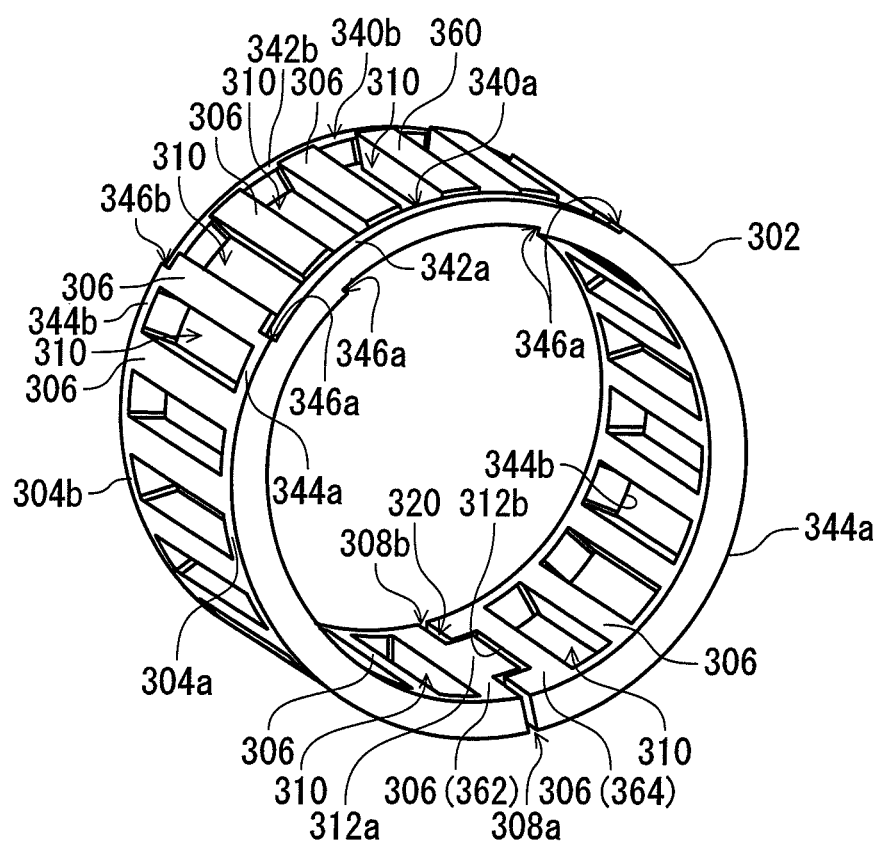
FIG. 22 is a perspective view showing an entire configuration of a radial roller bearing cage (single-split cage) according to an 11th embodiment of the present invention.

Moreover, as in cages 302 according to a ninth embodiment of the present invention shown in FIG. 20, according to a tenth embodiment of the present invention shown in FIG. 21, and according to an 11th embodiment of the present invention shown in FIG. 22, the thin sections 342a and 342b can be configured so as to be formed continuously while the decreased diameter portions of the outer circumferential sections and the increased diameter portions of the inner circumferential sections of the rim sections 304a and 304b are different in phase in the circumferential direction (along different widths (circumferential ranges). In other words, in this case, the configuration of the steps 346a and 346b formed at the boundaries of the thin sections 342a and 342b and the thick sections 344a and 344b on the outer diameter sides of the rim sections 304a and 304b in the radial direction is different from the configuration thereof on the inner diameter sides of the rim sections in the circumferential positions thereof (the phase in the circumferential direction). The decreased diameter portions of the outer circumferential sections and the increased diameter portions of the inner circumferential sections of the rim sections 304a and 304b should only be decreased or increased in diameter uniformly and formed continuously while each having a constant diameter (the same diameter) so that the decreased diameter portion of the outer circumferential section and the increased diameter portion of the inner circumferential section of the rim section 304a and the decreased diameter portion of the outer circumferential section and the increased diameter portion of the inner circumferential section of the rim section 304b have the same phase in the circumferential direction. In addition, the steps 346a and 346b should only be positioned at portions (on the pillar sections 306 of the rim sections 304a and 304b) where the pair of rim sections 304a and 304b are connected by the pillar sections 306 while having the same phase in the circumferential direction in both the rim sections 304a and 304b (however, the steps can also be positioned on the pockets 310 of the rim sections 304a and 304b).

In the ninth embodiment (FIG. 20), in order that the intermediate portions of the thin sections 342a and 342b in the circumferential direction are disposed so as to be nearly aligned with the start points 340a and 340b, the outer circumferential sections of the rim sections 304a and 304b are continuously decreased in diameter in the circumferential direction so as to have a predetermined width (along an outer circumferential region striding over the four pillar sections 306 and the three pockets 310 (in other words, rollers) as an example), and the inner circumferential sections of the rim sections 304a and 304b are continuously increased in diameter so as to have a width (along an inner circumferential region striding over the six pillar sections 306 and the five pockets 310 (in other words, rollers) as an example) larger than that of the portions in which the outer circumferential sections are decreased in diameter in the circumferential direction. In this case, the circumferential ranges in which the decreased diameter portions of the outer circumferential sections are superimposed on the increased diameter portions of the inner circumferential sections of the rim sections 304a and 304b in the circumferential direction, more specifically, the circumferential ranges being made thinner (decreased in thickness) than the thick sections 344a and 344b on both the outer diameter sides and the inner diameter sides in the radial direction are used as the thin sections 342a and 342b, and in the circumferential ranges in which the increased diameter portions of the inner circumferential sections are located beyond the decreased diameter portions of the outer circumferential sections in the circumferential direction, intermediate thick sections 348a and 348b being made thinner (decreased in thickness) than the thick sections 344a and 344b only on the inner diameter sides in the radial direction are formed. Hence, in the inner circumferential sections of the rim sections 304a and 304b, steps 346a and 346b are formed at the boundaries of the intermediate thick sections 348a and 348b and the thick sections 344a and 344b.

Provided that the increased diameter portions of the inner circumferential sections of the rim sections 304a and 304b are formed continuously so as to have a width larger than that of the decreased diameter portions of the outer circumferential section in the circumferential direction and that the increased diameter portions are superimposed on the decreased diameter portions in the circumferential direction, the circumferential width of the decreased diameter portions of the outer circumferential section may be set as desired. For example, as in the tenth embodiment of the present invention shown in FIG. 21, the cage 302 can have a configuration in which the inner circumferential sections of the rim sections 304a and 304b are continuously increased in diameter uniformly along the entire circumferences thereof. In this case, in the inner circumferential sections of the rim sections 304a and 304b, the thin sections 342a and 342b and the thick sections 344a and 344b are formed continuously without steps.

With the above-mentioned configuration of the thin sections 342a and 342b, for example, when a bearing is mounted on a rotation shaft having step sections, flange sections, etc. having various sizes, the vicinities of the inner diameter sides of the start points 340a and 340b of the rim sections 304a and 304b that serve as the tension sides when the crack section 320 (the deficit sections 308a and 308b) is expanded and the cage 302 (in short, the rim sections 304a and 304b) in increased in diameter can be made wider in the circumferential direction and thinner (decreased in thickness) than the vicinities of the outer diameter sides thereof. In other words, the circumferential widths (circumferential ranges) to be made thin in the vicinities on the outer diameter sides of the start points 340a and 340b of the rim sections 304a and 304b can be made as small as possible in comparison with those in the vicinities on the inner diameter sides (in other words, the amount to be decreased in thickness can be made as small as possible). Hence, even in the case that the cage 302 is used for end face guidance, the areas of the axial end faces of the rim sections 304a and 304b serving as the guide sections thereof can be obtained securely, the continuity on the outer diameter sides can be raised, and the stability during outer diameter guidance can be improved.

On the other hand, in the 11th embodiment (FIG. 22), in order that the intermediate portions of the thin sections 342a and 342b in the circumferential direction are disposed so as to be nearly aligned with the start points 340a and 340b, the outer circumferential sections of the rim sections 304a and 304b are continuously decreased in diameter in the circumferential direction so as to have a predetermined width (along an outer circumferential region striding over the six pillar sections 306 and the five pockets 310 (in other words, rollers) as an example), and the inner circumferential sections of the rim sections 304a and 304b are continuously increased in diameter so as to have a width (along an inner circumferential region striding over the four pillar sections 306 and the three pockets 310 (in other words, rollers) as an example) smaller than that of the portions in which the outer circumferential sections are decreased in diameter in the circumferential direction. In other words, the circumferential ranges in which the decreased diameter portions of the outer circumferential sections are superimposed on the increased diameter portions of the inner circumferential sections in the circumferential direction are made thinner (decreased in thickness) than the thick sections 344a and 344b on both the outer diameter sides and the inner diameter sides in the radial direction, and the circumferential ranges in which the decreased diameter portions of the outer circumferential sections are located beyond the increased diameter portions of the inner circumferential sections in the circumferential direction are made thinner (decreased in thickness) than the thick sections 344a and 344b only on the outer diameter sides in the radial direction. In other words, this embodiment is common to the above-mentioned ninth embodiment (FIG. 20) with respect to the circumferential range in which the decreased diameter portions of the outer circumferential sections are superimposed on the increased diameter portions of the inner circumferential sections in the circumferential direction, but is different from the ninth embodiment (in which the intermediate thick sections 348a and 348b are formed) in which the circumferential ranges are made thinner than the thick sections 344a and 344b only on the inner diameter sides in the radial direction in that the circumferential ranges are made thinner than the thick sections 344a and 344b only on the outer diameter sides in the radial direction.

In this case, provided that the decreased diameter portions of the outer circumferential sections of the rim sections 304a and 304b are formed continuity while having a width larger than that of the increased diameter portions of the inner circumferential sections in the circumferential direction and that the decreased diameter portions are superimposed on the increased diameter portions in the circumferential direction, the circumferential width of the decreased diameter portions with respect to the increased diameter portions of the inner circumferential sections can be set as desired. For example, it is possible to use a configuration in which the outer circumferential sections of the rim sections 304a and 304b are continuously increased in diameter uniformly along the entire circumferences (in other words, a configuration in which the thin sections 342a and 342b and the thick sections 344a and 344b are formed continuously without steps on the outer circumferential sections of the rim sections 304a and 304b).

With the above-mentioned configuration of the thin sections 342a and 342b, the vicinities of the outer diameter sides of the start points 340a and 340b of the rim sections 304a and 304b can be made wider in the circumferential direction and thinner (decreased in thickness) than the vicinities of the inner diameter sides thereof. In other words, the circumferential widths (circumferential ranges) to be made thin in the vicinities on the inner diameter sides of the start points 340a and 340b of the rim sections 304a and 304b can be made as small as possible in comparison with those in the vicinities on the outer diameter sides (in other words, the amount to be decreased in thickness can be made as small as possible). Hence, for example, even in the case that the cage 302 (in short, the rim sections 304a and 304b) is required to decreased in diameter when a bearing is mounted in a hole section or the like having steps, since the vicinities of the outer diameter sides of the start points 340a and 340b that serve as the tension sides at the time are made wider in the circumferential direction and thinner (decreased in thickness) than the vicinities of the inner diameter sides thereof, the cage 302 can be decreased in diameter smoothly.

In the above-mentioned ninth embodiment to the 11th embodiment (FIG. 20 to FIG. 22), the sizes, shapes, numbers and disposition intervals of the thin sections 342a and 342b (the decreased diameter portions of the outer circumferential sections and the increased diameter portions of the inner circumferential sections) can be set as desired (as in the above-mentioned seventh embodiment).

For example, in these embodiments, on the rim sections 304a and 304b, the decreased diameter portion of the outer circumferential section and the increased diameter portion of the inner circumferential section are each disposed, only at one portion, and the thin sections 142a and 142b are disposed, one each; however, it is possible to use a configuration in which the decreased diameter portions of the outer circumferential sections and the increased diameter portions of the inner circumferential sections are respectively formed at pluralities of portions, whereby a plurality of thin sections are disposed. This kind of configuration is shown as a 12th embodiment of the present invention.

Figure 23:
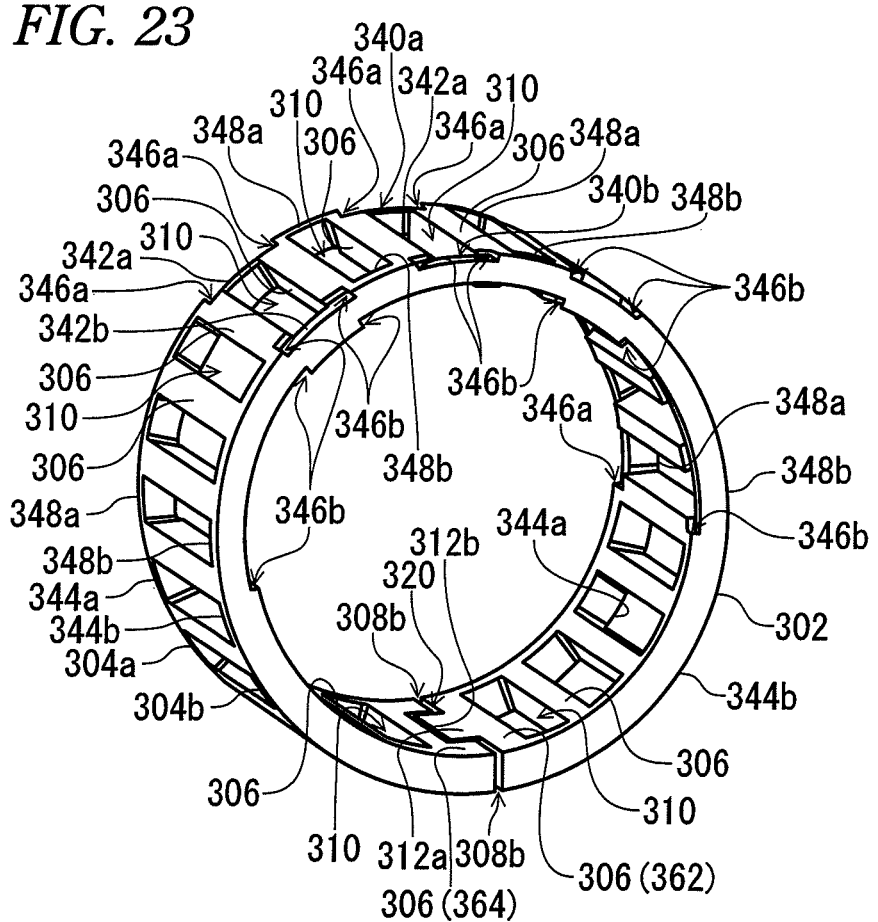
FIG. 23 is a perspective view showing an entire configuration of a radial roller bearing cage (single-split cage) according to a 12th embodiment of the present invention.

FIG. 23 shows an example of the configuration of a cage 302 in which the decreased diameter portions at the third portions are formed on each of the outer circumferential sections of the rim sections 304a and 304b, and the increased diameter portions are formed on each of the inner circumferential sections thereof, whereby the thin sections 342a and 342b are disposed. In this case, the vicinities on the outer diameter sides of the start points 340a and 340b are decreased in diameter continuously while having a predetermined width in the circumferential direction (along the outer circumferential regions striding over two pillar sections 306 and one pocket 310 (in other words, a roller), as an example), and on both sides of the decreased diameter portions in the circumferential direction (hereafter referred to as start point decreased diameter portions) and at a predetermined interval (an outer circumferential region striding over two pillar sections 306 and one pocket 310, as an example), the decreased diameter portions that are formed by continuously decreasing in diameter the outer circumferential sections of the rim sections 304a and 304b while having the same width as that of the start point decreased diameter portions in the circumferential direction, one on each side. In addition, the vicinities on the inner diameter sides of the start points 340a and 340b are increased in diameter continuously while having a width (the same width as that of the increased diameter portions of the inner circumferential sections of the rim sections 304a and 304b) according to the above-mentioned 11th embodiment (FIG. 22) as an example) larger than that of the start point decreased diameter portions in the circumferential direction, and on both sides of the increased diameter portions in the circumferential direction (hereafter referred to as start point increased diameter portions) and at a predetermined interval (an inner circumferential region striding over two pillar sections 306 and one pocket 310, as an example), the increased diameter portions that are formed by continuously increasing in diameter the inner circumferential sections of the rim sections 304a and 304b while having the same width as that of the start point increased diameter portions in the circumferential direction, one on each side.

More specifically, in this embodiment, the decreased diameter portions of the outer circumferential sections and the increased diameter portions of the inner circumferential sections of the rim sections 304a and 304b are disposed so as to be distributed to both sides of the centers of the start points 340a and 340b in the circumferential direction. In other words, thinned sections made thin by decreasing in diameter the rim sections 304a and 304b on the outer diameter sides or by increasing in diameter the rim sections on the inner diameter sides thereof are disposed so as to be distributed in the circumferential direction. Hence, also in this embodiment, on the rim sections 304a and 304b, intermediate thick sections 348a and 348b are formed at portions that are made thinner (decreased in thickness) than the thick sections 344a and 344b only on the inner diameter sides in the radial direction, and in the inner circumferential sections of the rim sections 304a and 304b, steps 346a and 346b are formed at the boundaries of the intermediate thick sections 348a and 348b and the thick sections 344a and 344b (as in the above-mentioned ninth embodiment (FIG. 20)).

The disposition number of the decreased diameter portions of the outer circumferential sections and that of the increased diameter portions of the inner circumferential sections (the disposition number of the thinned sections on the outer diameter side and that on the inner diameter side) are not limited particularly and can be set as desired depending on the size, material, etc. of the cage 302; furthermore, the number of the decreased diameter portions and that of the increased diameter portion may be the same or different.

In addition, the decreased diameter of the decreased diameter portions of the outer circumferential sections and the increased diameter of the increased diameter portions of the inner circumferential sections are not limited particularly, and diameter decrease and diameter increase may be performed by the same dimension (in a state of being dented by the same dimension in the radial direction on both the outer diameter sides and the inner diameter sides from the thick sections 344a and 344b (a state in which the thickness is decreased by the same amount)), or diameter decrease and diameter increase may be performed by different dimensions (in a state of being dented by different dimensions in the radial direction on the outer diameter sides and the inner diameter sides from the thick sections 344a and 344b (a state in which the thickness is decreased by different amounts)). For example, in the start point decreased diameter portions and the start point increased diameter portions, the rim sections 304a and 304b are decreased in diameter from the outer diameter sides and increased in diameter from the inner diameter sides (decreased in thickness on both the outer diameter sides and the inner diameter sides) so as to be made thin; hence, the amounts to be decreased in thickness on the outer diameter sides and the inner diameter sides are limited to some extent in consideration of the strength of the rim sections 304a and 304b themselves. For this reason, by making the amounts to be decreased in thickness at the start point decreased diameter portions and the start point increased diameter portions small and by making the amounts to be decreased in thickness at the decreased diameter portions and the increased diameter portions on both sides of these in the circumferential direction larger than those of the start point decreased diameter portions and the start point increased diameter portions, the diameter increase performance (the expandability of the crack section 320 (the deficit sections 308a and 308b) from a different point of view) of the cage 302 (in short, the rim sections 304a and 304b) can be obtained securely, and the strength of the cage 302 can also be obtained securely.

More specifically, with this embodiment, while the diameter increase performance of the cage 302 is improved and while an optimal opening amount is securely obtained, the strength of the cage 302 can be improved at the same time.

Furthermore, in the seventh embodiment to the 12th embodiment (FIG. 18 to FIG. 23) described above, a configuration is used in which the steps 346a and 346b are formed at the boundaries of the thin sections 342a and 342b and the thick sections 344a and 344b, and the thin sections 342a and 342b and the thick sections 344a and 344b are disposed on the outer circumferential sections of the pair of rim sections 304a and 304b or on the inner circumferential sections thereof in addition to the outer circumferential sections; however, it is possible to assume a configuration in which the thin sections 342a and 342b and the thick sections 344a and 344b are formed continuously without forming the steps 346a and 346b at the boundaries.

Figure 24:
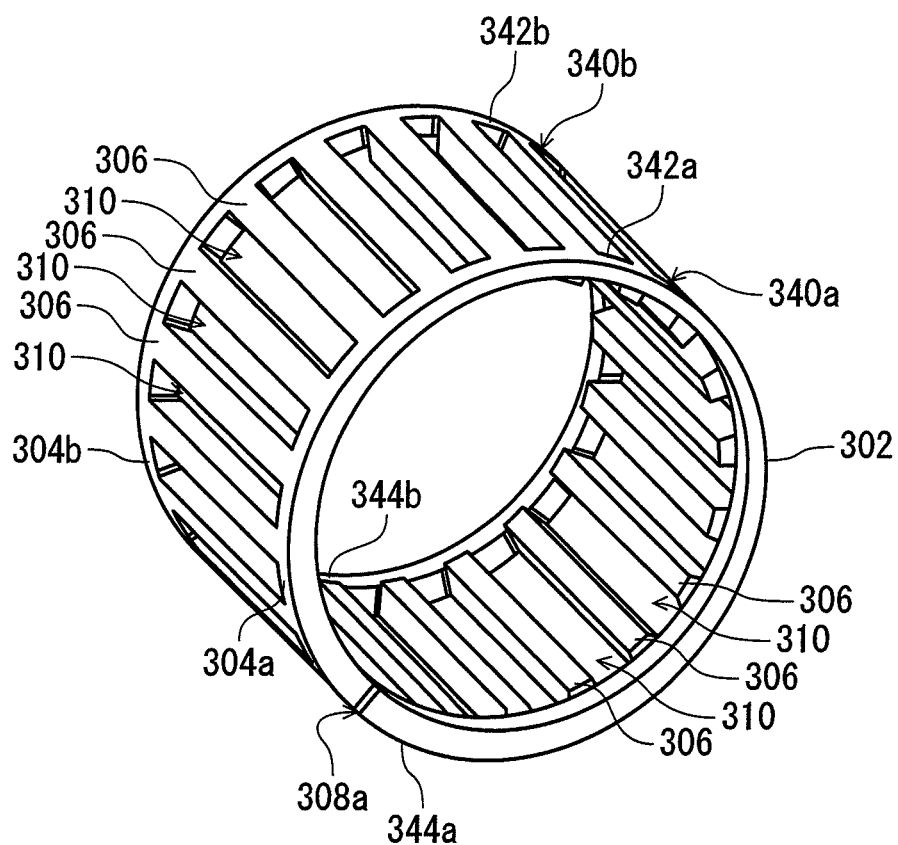
FIG. 24 is a perspective view showing an entire configuration of a radial roller bearing cage (single-split cage) according to a 13th embodiment of the present invention.

This configuration in which the thin sections 342a and 342b and the thick sections 344a and 344b are formed continuously without forming steps is shown in FIG. 24 as a 13th embodiment of the present invention. The cage 302 according to this embodiment has a configuration suited for the cage for outer ring guidance.

In this embodiment, the pair of rim sections 304a and 304b are disposed so as to be opposed to each other in a state in which the centers of the inner circumferential sections thereof (imaginary inner circumferential circles formed by continuously forming the deficit sections 308a and 308b of the rim sections 304a and 304b) are made eccentric with respect to the rotation axis (equivalent to the center of an imaginary circle (pitch circle) formed by connecting the centers of the rollers held in the respective pockets) of the cage 302 to the opposite sides (the sides of the portions (the start point sections 340a and 340b) dislocated by 180° in phase from the deficit sections 308a and 308b in the circumferential direction).

In this case, the pair of rim sections 304a and 304b has a configuration formed of thin sections 342a and 342b, the inner circumferential sections of which are made larger in diameter than the inner circumferential sections of the pillar sections 306 so that the thin sections are made thinner in the radial direction, and thick sections 344a and 344b made smaller in diameter than the thin sections 342a and 342b and made thicker in the radial direction. Furthermore, at the portions (the start points 340a and 340b) positioned on the opposite sides of the deficit sections 308a and 308b with respect to the centers of the inner circumferential sections of the pair of rim sections 304a and 304b, the thin sections 342a and 342b are disposed, and the thin sections 342a and 342b and the thick sections 344a and 344b are gradually decreased in inside diameter from the thinnest portions of the thin sections 342a and 342b and continued to the thickest portions of the thick sections 344a and 344b without steps.

In this embodiment, in the inner circumferential sections of the rim sections 304a and 304b, the steps 346a and 346b (FIG. 18 to FIG. 23) are not formed at the boundaries of the thin sections 342a and 342b and the thick sections 344a and 344b; however, the thicknesses of the inner circumferential sections of the rim sections 304a and 304b in the radial direction can be prevented from being uniform along the entire circumferences and can thus be changed. Hence, for example, even in the case that an inner track is formed into a concave shape on the outer circumferential face of an inner member (an inner ring, a shaft, etc. being rotatable during use) and the cage 302 is used to guide the end faces thereof, any regions of the inner circumferential sections of the rim sections 304a and 304b extending from the thin sections 342a and 342b to the thick sections 344a and 344b can be allowed to interfere along the fringe of the inner track formed into the concave shape, and the cage 302 can be effectively prevented from riding over the outer circumferential face of the inner member. As a result, not only the cage 302 but also a bearing can be configured without being limited in the configuration of the peripheral sections of the bearing, as in the seventh embodiment to the 12th embodiment (FIG. 18 to FIG. 20) described above.

In this embodiment, the inner circumferential sections of the pair of rim sections 304a and 304b are configured so as to be made eccentric with respect to the rotation axis of the cage 302; however, for example, it is possible to use a configuration wherein in a state in which the centers of the outer circumferential sections of the pair of rim sections 304a and 304b are made eccentric with respect to the rotation axis of the cage 302 toward the deficit sections (on the opposite sides of the start point sections), the rim sections are disposed so as to be opposed to each other. In this case, the pair of rim sections 304a and 304b is configured so as to be formed of the thin sections, the diameter of which is made smaller in diameter than that of the outer circumferential sections of the pillar sections 306, and the thick sections made larger in diameter than the thin sections and made thicker in the radial direction. Moreover, in the portions (the start point sections 340a and 340b) positioned on the opposite sides of the deficit sections 308a and 308b with respect to the centers of the outer circumferential sections of the pair of rim sections 304a and 304b, a configuration should only be used in which the thin sections are disposed, and the thin sections and the thick sections are gradually decreased in inner diameter from the thinnest portions of the thin sections and continued to the thickest portions of the thick sections without steps.

Still further, a configuration may be used in which both the inner circumferential sections and the outer circumferential section of the pair of rim sections 304a and 304b are made eccentric with respect to the rotation axis of the cage 302, the centers of the inner circumferential sections are made eccentric with respect to the rotation axis of the cage 302 and positioned on the sides of the start point sections 340a and 340b, and the centers of the outer circumferential sections are made eccentric with respect to the rotation axis of the cage 302 and positioned toward the deficit sections 308a and 308b.

With the cages 302 according to the seventh embodiment to the 13th embodiment (FIG. 18 to FIG. 24) according to the present invention described above, the crack section 320 can be expanded easily and sufficiently while avoiding reduction in strength and decrease in the number of rollers to be held; in addition, the cage can be prevented effectively from riding over track members (the outer circumferential face of an inner member (an inner ring, a shaft, etc. being rotatable during use) and the inner circumferential face of an outer member (an outer ring or a housing being maintained in a non-rotating state at all times or a gear, a roller, etc. being rotatable during use)).

The present invention is not limited to the above-mentioned embodiments but can be modified, improved, etc. as necessary, and the above-mentioned embodiments and modified examples can be combined and applied in implementable ranges.

For example, the single-split cages according to the second to 13th embodiments may be configured so as to have the split section described in the first embodiment, and the present invention is applicable to the single-split cages of the double-row type described referring to FIG. 11 and FIG. 12.

Although the present application has been described in detail referring to the specific embodiments, it is obvious to those skilled in the art that the various changes and modifications can be made without departing from the spirit and scope of the present invention.

The present application is based on Japanese Patent Application (No. 2010-205691) filed on Sep. 14, 2010, Japanese Patent Application (No. 2010-257211) filed on Nov. 17, 2010, Japanese Patent Application (No. 2011-141439) filed on Jun. 27, 2011, Japanese Patent Application (No. 2011-172595) filed on Aug. 8, 2011, Japanese Patent Application (No. 2011-172599) filed on Aug. 8, 2011, Japanese Patent Application (No. 2011-182771) filed on Aug. 24, 2011 and Japanese Patent Application (No. 2011-192973) filed on Sep. 5, 2011, and the contents thereof are herein incorporated by reference.

DESCRIPTION OF REFERENCE NUMERALS AND SIGNS 2 single-split cage
2p pocket
4, 6 circular ring section
8 pillar section
10 split section
10a one-side split region
10b other-side split region
30 diameter-increase restricting concave section
32 diameter-increase restricting convex section
Sa one-side split face
Sb other-side split face

What is claimed is:
1. A single-split cage comprising:
a pair of rim sections and a plurality of pillar sections, wherein:
the pair of rim sections has a discontinuous incomplete ring shape, respectively having deficit sections, each at one portion, and the deficit sections of the rim sections are disposed coaxially in an axial direction so as to be opposed to each other with a predetermined clearance provided therebetween in a state in which the deficit sections have a same phase in a circumferential direction;
the plurality of pillar sections are used to connect the pair of rim sections and to separate a region between the rim sections in the circumferential direction of the rim sections, thereby forming pockets for allowing rollers serving as rolling elements to be inserted and held rotatably;
the pair of rim sections has thin sections being thin in a radial direction, the diameter of outer circumferential sections of which is made smaller than that of an outer circumferential section of the pillar sections, and also has thick sections being thick in the radial direction, a diameter of which is made larger than that of the thin sections, the thin sections having a smaller dimension in the radial direction than the thick sections;

the thin sections are disposed at portions positioned on an opposite side of the deficit sections with respect to the center of the outer circumferential sections of the pair of rim sections;

inner circumferential sections of the pair of rim sections are made larger in diameter than inner circumferential sections of the pillar sections, whereby the thin sections are made thinner than the thick sections on both outer diameter sides and inner diameter sides in the radial direction; and portions made thinner than the thick sections on the outer diameter sides in the radial direction and the portions made thinner than the thick sections on inner circumferential sides in the-radial direction are disposed in the same phase in the circumferential direction.

2. The single-split cage according to claim 1, wherein boundaries of the thin sections and the thick sections are positioned at portions in which the pair of rim sections is connected by the pillar sections.

3. A single-split cage comprising:

a pair of rim sections and a plurality of pillar sections, wherein:

the pair of rim sections has a discontinuous incomplete ring shape, respectively having deficit sections, each at one portion, and the deficit sections of the rim sections are disposed coaxially in an axial direction so as to be opposed to each other with a predetermined clearance provided therebetween in a state in which the deficit sections have a same phase in a circumferential direction;

the plurality of pillar sections are used to connect the pair of rim sections and to separate a region between the rim sections in the circumferential direction of the rim sections, thereby forming pockets for allowing rollers serving as rolling elements to be inserted and held rotatably;

the pair of rim sections has thin sections being thin in a radial direction, the diameter of outer circumferential sections of which is made smaller than that of an outer circumferential section of the pillar sections, and also has thick sections being thick in the radial direction, a diameter of which is made larger than that of the thin sections, the thin sections having a smaller dimension in the radial direction than the thick sections;

the thin sections are disposed at portions positioned on an opposite side of the deficit sections with respect to the center of the outer circumferential sections of the pair of rim sections;

inner circumferential sections of the pair of rim sections are made larger in diameter than inner circumferential sections of the pillar sections, whereby the thin sections are made thinner than the thick sections on both outer diameter sides and inner diameter sides in the radial direction; and portions made thinner than the thick sections on the outer diameter sides in the radial direction and the portions made thinner than the thick sections on inner circumferential sides in the radial direction are disposed in different phases in the circumferential direction.

4. The single-split cage according to claim 3, wherein boundaries of the thin sections and the thick sections are positioned at portions in which the pair of rim sections is connected by the pillar sections.

5. A single-split cage equipped with:

a pair of rim sections and a plurality of pillar sections, wherein:

the pair of rim sections has a discontinuous incomplete ring shape, respectively having deficit sections, each at one portion, and the deficit sections of the rim sections are disposed coaxially in an axial direction so as to be opposed to each other with a predetermined clearance provided therebetween in a state in which the deficit sections have a same phase in a circumferential direction;

the plurality of pillar sections are used to connect the pair of rim sections and to separate a region between the rim sections in the circumferential direction of the rim sections, thereby forming pockets for allowing rollers serving as rolling elements to be inserted and held rotatably; and the pair of rim sections are disposed so as to be opposed to each other in a state in which centers of inner circumferential sections thereof are made eccentric with respect to a rotation axis of the cage to opposite sides.

6. The single-split cage according to claim 5, wherein:

the pair of rim sections has thin sections being thin in a radial direction, a diameter of the inner circumferential sections of which is made larger than that of inner circumferential sections of the pillar sections, and also has thick sections being thick in the radial direction, a diameter of which is made smaller than that of the thin sections, the thin sections having a smaller dimension in the radial direction than the thick sections;

the thin sections are disposed at portions positioned on the opposite side of the deficit sections with respect to the center of the inner circumferential sections of the pair of rim sections; and the thin sections and the thick sections are formed continuously without steps such that an inner diameter is decreased from the thin sections to the thick sections.

* * * * *